Oct. 14, 1958   S. FOSTER, JR., ET AL   2,856,082
PARKING APPARATUS
Filed June 9, 1955   11 Sheets-Sheet 4
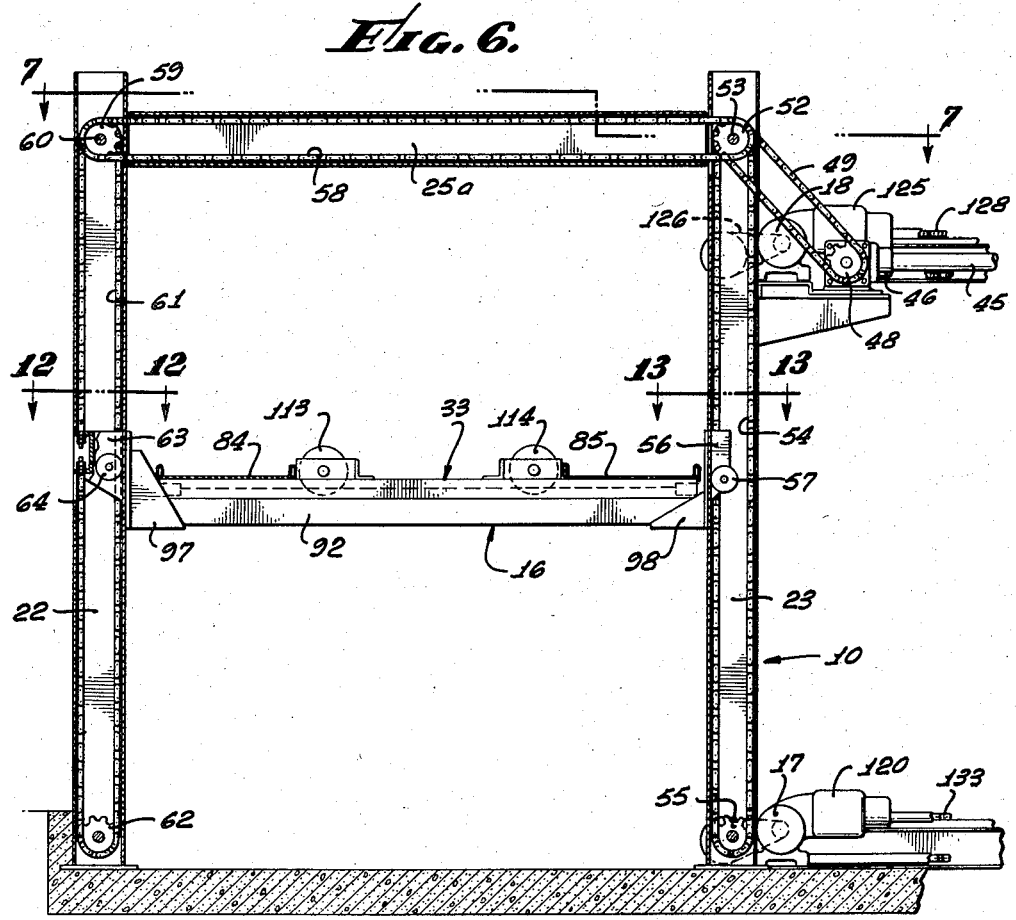
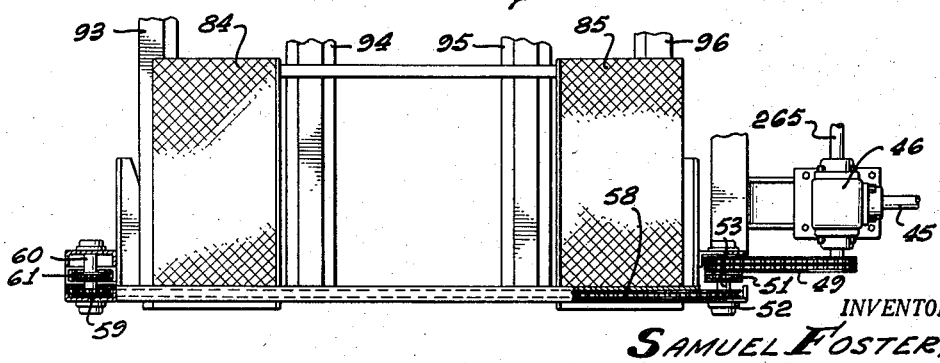
INVENTORS:
SAMUEL FOSTER, JR.
LOUIS A. GAUTHEY
BY Bernard Kriegel
ATTORNEY.

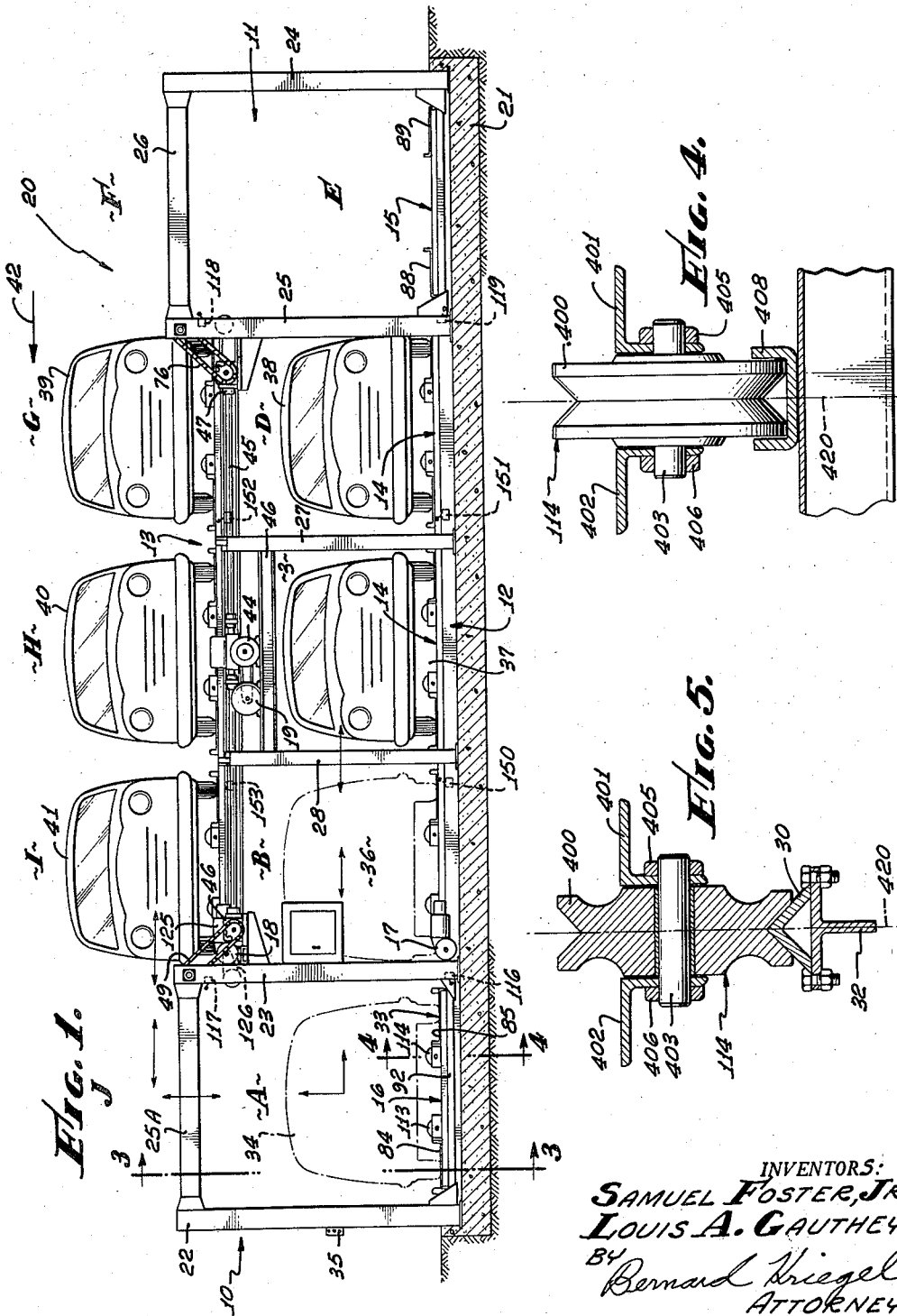

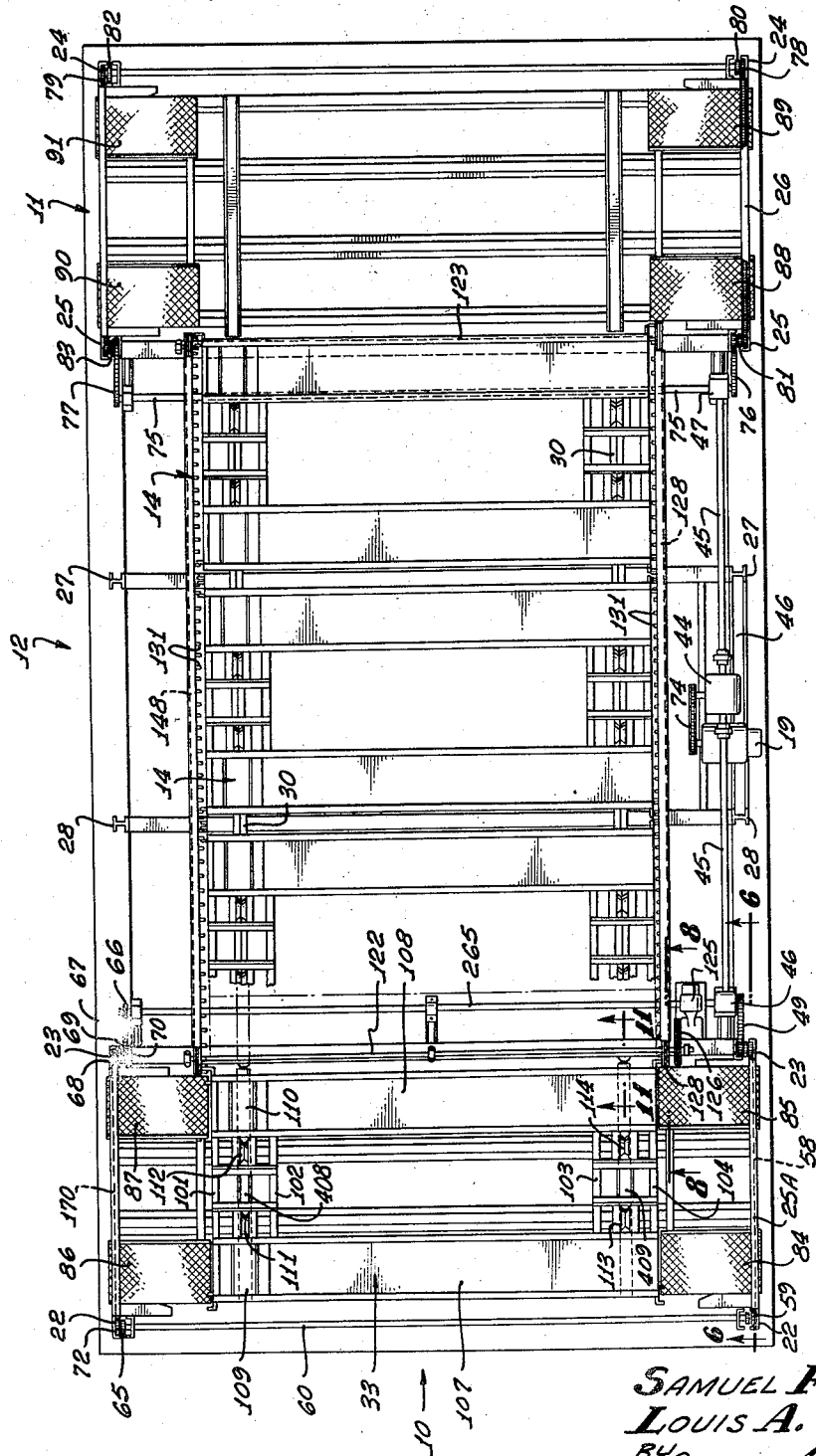

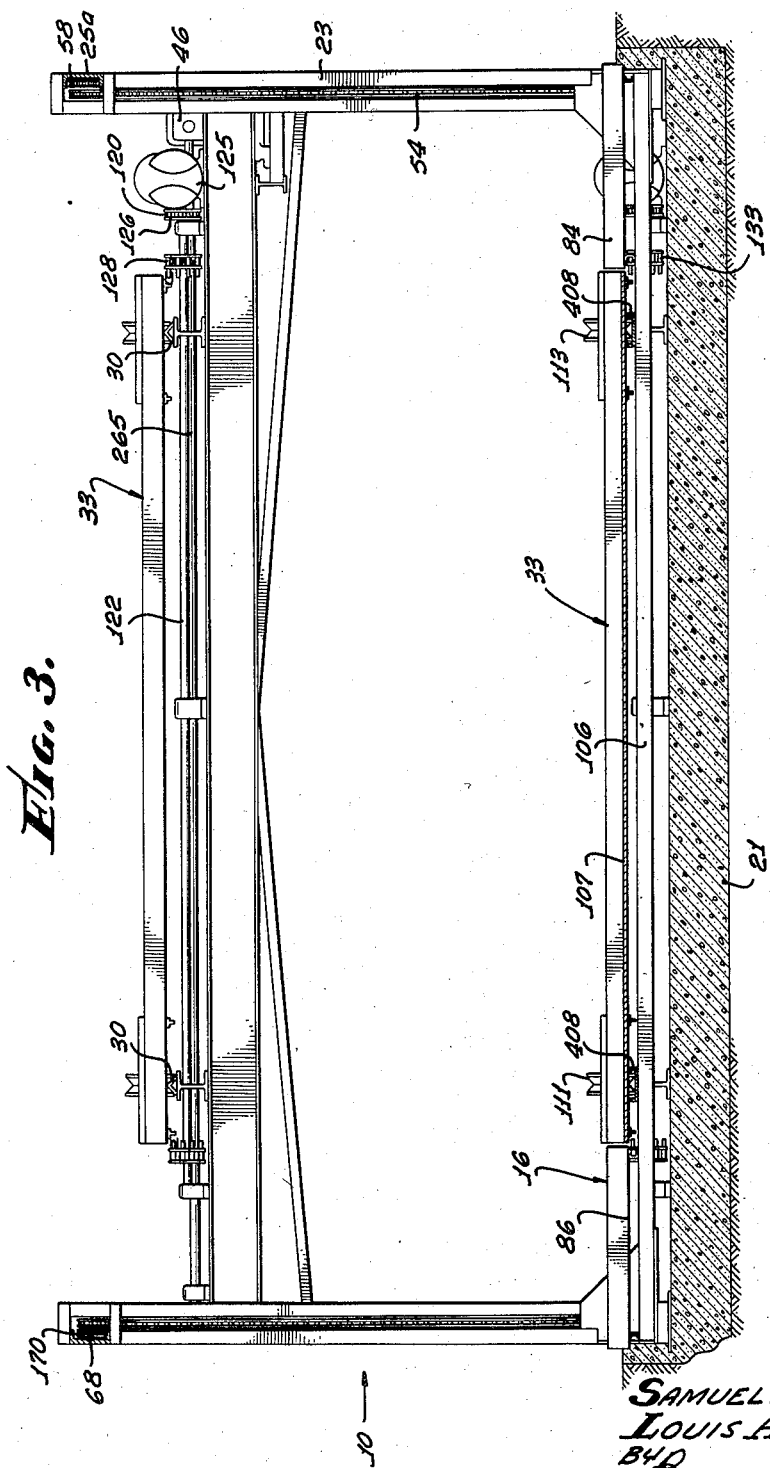

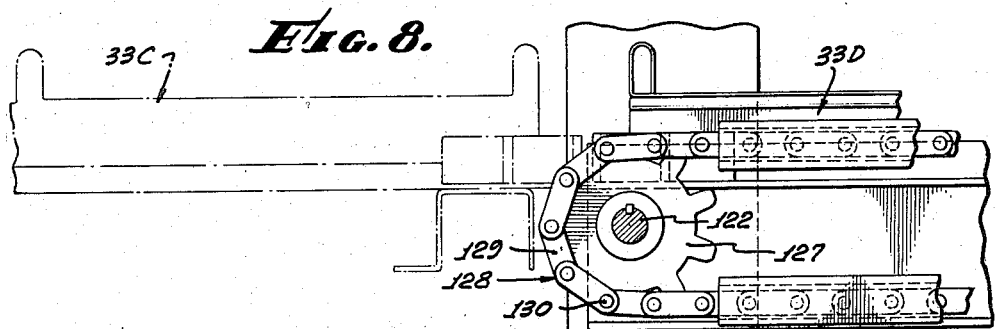
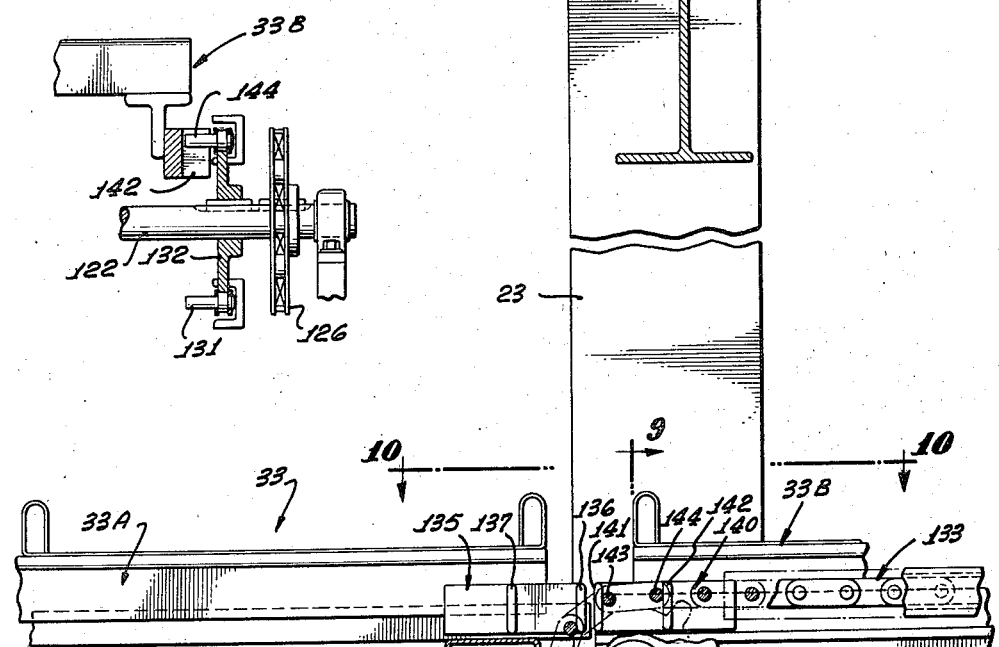
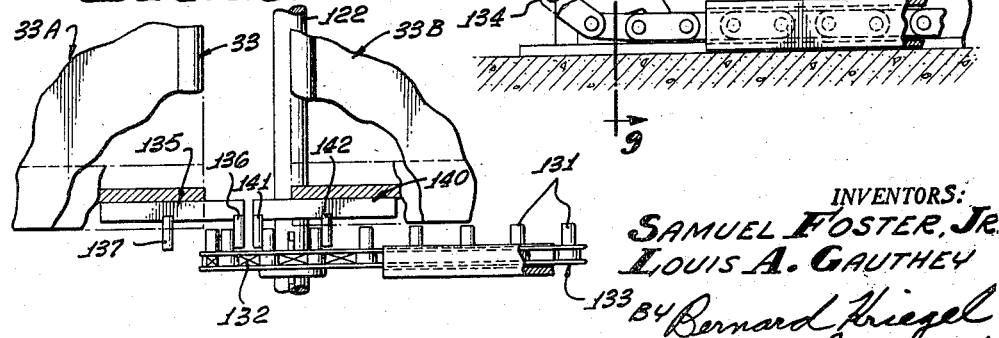

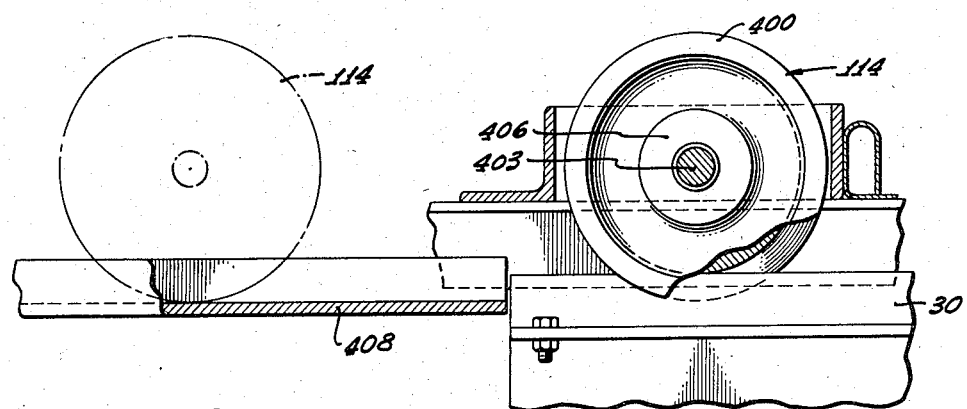
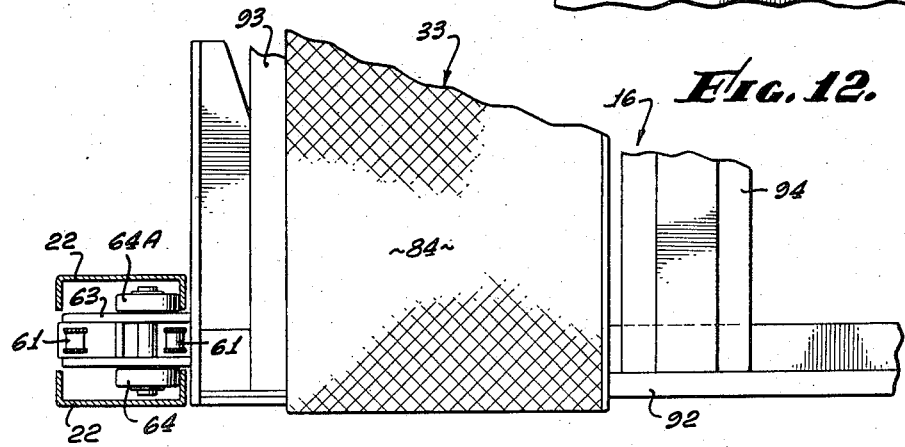
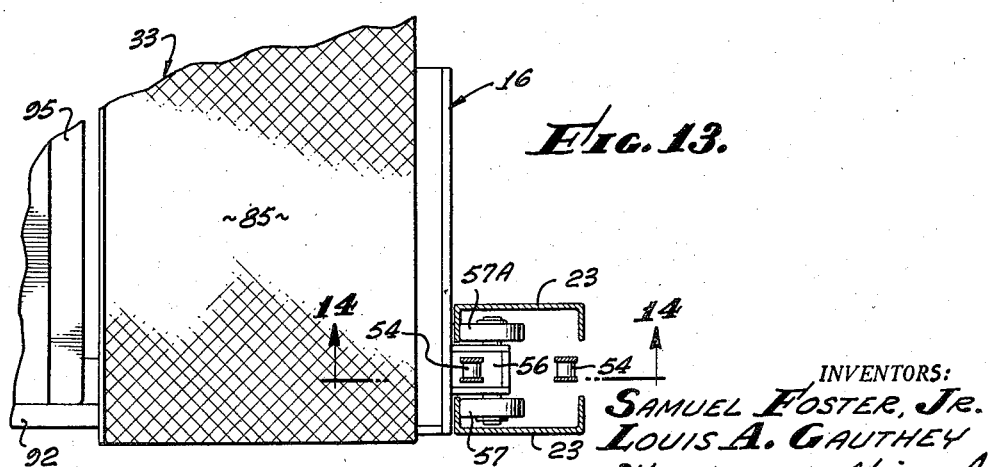

Oct. 14, 1958  S. FOSTER, JR., ET AL  2,856,082
PARKING APPARATUS
Filed June 9, 1955  11 Sheets-Sheet 7

INVENTORS:
SAMUEL FOSTER, JR.
LOUIS A. GAUTHEY
BY Bernard Kriegel
ATTORNEY.

Oct. 14, 1958  S. FOSTER, JR., ET AL  2,856,082
PARKING APPARATUS
Filed June 9, 1955  11 Sheets-Sheet 10

FIG. 18.

- ─╱╲─ Normally Closed Contact-Mech Operated (Limit Switch)
- ─◯─ Relay Coil
- ─╢╱╱─ Normally Open Relay Contact (#1)
- ─╢╱─ Normally Closed Relay Contact (#5)
- ─◯TDAE─ Timing Relay Coil- Time Delay After Energizing
- ─╳T.O.─ Time Relay Contact-Normally Closed-Timed Opening
- ─o o─ Normally Open Push Button Contact
- ─▭─ Fuse
- ─o⁄o─ Manually Operated Switch-Normally Open

FIG. 19.

| RELAY | FUNCTION |
|---|---|
| 1F | Forward Contactor -Motor No. 17 |
| 1R | Reverse  "   "  No. 17 |
| 2F | Forward  "   "  No. 18 |
| 2R | Reverse  "   "  No. 18 |
| VU | Vertical Up Contactor - Motor No. 19 |
| VD |  " Down  "   "  No. 19 |
| 1FX | Auxiliary to Relay 1F |
| 1FT | Timing Relay for Relay 1F |
| 1FA | Pilot  "   "   "   " |
| 2FT | 2F Timing Relay |
| 2FA | " Pilot  " |
| VUX | Auxiliary Relay to Relay VU |
| VUA | Pilot  " for  "   " |
| VDA |  "   "   "   "  VD |
| VUP | Vertical Up Protective Relay |
| DDP |  " Down  "   " |
| 1RT | Timing Relay for Relay 1R |
| 2RT |  "   "   "   "  2R |
| 1RX | Auxiliary Relay to Relay 1R |
| 1RXA | Pilot  "   "   "  1RX |
| 2RA |  "   "   "   "  2R |
| 1RA |  "   "   "   "  1R |
| VT | Vertical Motion Timing Relay |
| HT | Horizontal  "   "   " |
| VTX | Vertical Auxiliary Relay |
| HTX | Horizontal  "   " |

INVENTORS:
SAMUEL FOSTER, JR.
LOUIS A. GAUTHEY
BY Bernard Kriegel
ATTORNEY.

Oct. 14, 1958  S. FOSTER, JR., ET AL  2,856,082
PARKING APPARATUS
Filed June 9, 1955  11 Sheets-Sheet 11
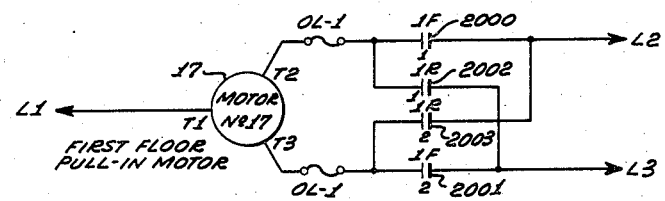
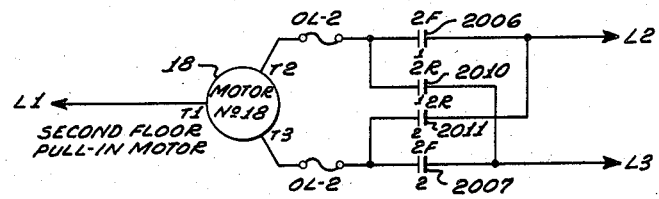
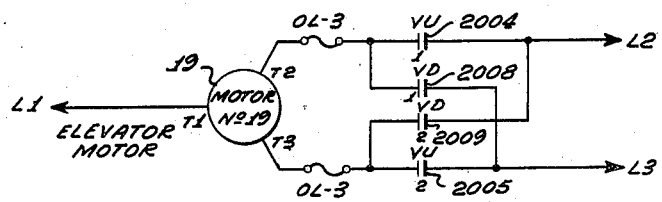
FIG. 20.
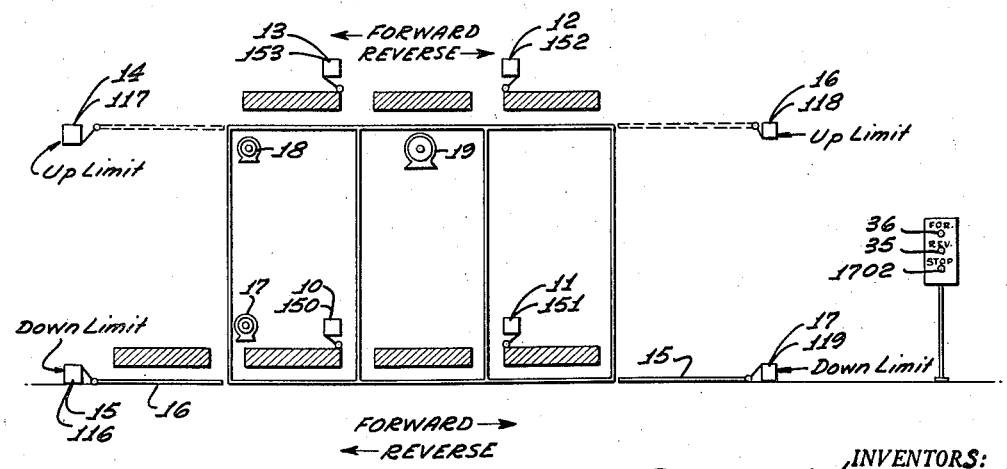
FIG. 21.
INVENTORS:
SAMUEL FOSTER, JR.
LOUIS A. GAUTHEY
BY Bernard Kriegel
ATTORNEY.

United States Patent Office 2,856,082
Patented Oct. 14, 1958

2,856,082

PARKING APPARATUS

Samuel Foster, Jr., Los Angeles, and Louis A. Gauthey, Redondo Beach, Calif.; said Gauthey assignor to said Foster, Jr.

Application June 9, 1955, Serial No. 514,336

13 Claims. (Cl. 214—16.1)

This invention relates to an apparatus for storing the maximum number of packaged loads or unit loads in an allotted volume or available ground area. Suitable applications of such apparatus may be found in warehouses for storing large pieces of packaged loads, and for use in parking a large number of motor vehicles or automobiles on a limited ground area. In the latter case the automatic parking system is the only practicable and economically feasible answer to the space problem wherever the ground area is at a premium and the cost of land is high. This is usually the case in shopping or business districts and it is also the case in a large number of city districts used for multiple unit dwellings, such as apartment buildings.

Since the present invention will find most immediate and widest application in connection with parking of motor vehicles, or automobiles, it is described and illustrated in connection with this type of use of the invention. It is to be understood, however, that the invention is not limited to such use, and when it is used for storing goods, such goods may be packed first into boxes, or loaded on platforms provided with suitable casters or wheels for facilitating the use of such boxes or platforms in connection with the disclosed apparatus. With the advent and wide use of pick-up lift trucks, provided with pick-up forks and elevators, it becomes possible and convenient to use boxes and platforms without any casters or wheels since such wheels are provided in such a case by the lift trucks.

Motor vehicle parking mechanisms or automatic parking systems enable one to park more cars per unit of volume, and unit area, with a minimum amount of attendants or, if so desired, even without any attendants whatsoever, and, therefore, are more efficient and economical in these respects than the conventional multi-level garages with ramps wherein the automobiles are driven up or down an inclined ramp to reach the desired level. The ramp garages require large structures since the ramps and the open driveways at times take up approximately half of the available volume. Moreover, such garages require a large number of attendants. The automatic or semi-automatic car parking mechanisms known to the prior art eliminate the ramps and reduce the dimensions of the driveways by providing tiered storage structures having transversely extending stalls at each level, in side-by-side relationship to each other, as in conventional multi-level garages. The vehicles are transported into stalls by means of conveyors, elevators, and car-carrying carriages. Systems of this type do not utilize space to the best advantage and are expensive to build because they require the use of a large number of costly and mechanically complex elements. Moreover, the electrical relay control systems required for the operation of such systems are also complex and add an additional financial burden to such systems. Accordingly, the known parking systems are not suitable for small installations because of the prohibitive initial cost of such installations and high operating costs.

The present invention increases the space utilization efficiency of the automatic parking systems and reduces the number of the operating elements necessary for the operation of the system to an absolute minimum, thus making the disclosed automatic parking system economically feasible even when such system must provide space for only a limited number of vehicles. The improved automatic parking system is so constructed that it can be readily expanded for providing automatic parking facilities for a larger number of cars by adding a reasonable number of unit cells or stalls to the original system. The cells can be added in pairs when they are added in a horizontal direction and if vertical additions are required, then the additions are made by constructing additional vertical rows or floors. Accordingly, the minimum number of floors in the system is two floors, and the maximum number of floors is determined, as usual, by purely economic considerations.

In its simplest form, the invention discloses a parking system including two elevators at two extreme ends of the system, and two rows or two floors of stalls between the elevators. The first floor, or ground floor, row is on the ground floor or level and is on the same level as the elevator platforms when these platforms are in their normal lower rest positions. The second row is directly above the first one, and constitutes the "second story" or the second floor, or level, of the parking system. The elevators and the stalls are provided with the vehicle-carrying carriages or flatbeds provided with rollers or wheels. A vehicle is driven onto the elevator platform while one of the carriages, or flatbeds, rests on the elevator platform with the vehicle coming to rest on the carriage which in turn rests on the elevator platform. The carriage is then moved sideways, or transversely with respect to the longitudinal axis of the vehicle, and is parked in one of the stalls. The two rows of stalls can be filled completely with vehicles by means of the automatically operated elevators and carriages which are pulled sideways by means of two pull-in motors. Each carriage is capable of traveling around a closed loop having two horizontal legs and two vertical legs. The locus of the path of the loop, therefore, is a rectangle, with the vehicle being transported laterally, or sideways, when it travels along the two horizontal legs of the loop. The system is so arranged that the upper and lower levels can be filled completely from end to end with the vehicles mounted on the carriages, with the elevators remaining empty when the entire system is filled with the vehicles to its full capacity. Accordingly, there is a more effective utilization of the available space; i. e., the volumetric efficiency of the system is very high. The system is so arranged that carriages, and the vehicles on top of them, can be transported around the loop either in a clockwise or a counter-clockwise direction for increasing the operational versatility, efficiency, and utility of the system, and for reaching the desired vehicle in the shortest possible interval of time.

The invention also discloses a relay system for an automatic control of the entire parking system so that the entire operation of the system is push-button controlled.

It is, therefore, an object of this invention to provide an automatic storage system having high volumetric efficiency and also high operational flexibility.

It is also an object of this invention to provide an automatic parking system having a minimum number of mechanical components, and having a geometrically simple locus for the path of travel, this locus being a rectangle with the vehicles traveling laterally or sideways along the horizontal legs of said path during the operating cycle of the system.

Still another object of this invention is to provide an automatic parking system in which vehicles travel around a vertically positioned rectangular loop lying in a single vertical plane and having two vertical and two horizontal legs, the direction of travel being reversible at any time so that the vehicles can be made to travel either in a clockwise or a counter-clockwise direction around the loop.

It is also an object of this invention to provide a parking system unit, an electrical relay system for automatic operation of said system, said system including one elevator motor and two pull-in motors, only one motor being in operation at any given time.

Still another object of this invention is to provide an automatic parking or storage system which can be operated by actuating a circuit-closing push-button, with the result that the vehicles remain on the carriage—which originally received the vehicle—throughout the storage cycle and without any necessity of shifting the vehicles to different carriages or from one carriage to another carriage, thus preventing any possibility of any damage to the stored vehicles and simplifying the operating cycle of the system.

It is also an additional object of the invention to provide an automatic electrically operated control system which is capable of bringing any desired stored vehicle, or stored load, to an unloading position upon an actuation of an electrical circuit.

A still additional object of this invention is to provide automatic safety devices which de-activate the automatic control system if it is erroneously actuated by an operator when the system is fully loaded and is not capable of receiving any additional vehicles.

One of the objects of this invention is to provide a relay system for controlling the operation of an elevator motor and a plurality of pull-in motors, the number of the pull-in motors being equal to the number of levels or floors used in the automatic parker, the disclosed relay system being provided with automatic lock-out circuits for preventing simultaneous erroneous operation of other motors when the desired motor performs the desired operating step or function assigned to such motor.

Yet another object of this invention is to provide an automatic parker for automobiles in which the automobiles are stored in side-by-side relationship in two vertically spaced storage areas, these areas being devoid of any aisles for shifting cars in and out of the stalls with the result that the stall areas can be 100% occupied by the stored vehicles with the concomitant maximum space-utilization efficiency that is geometrically possible.

An additional object of this invention is to provide an automatic parking system having a relay system which automatically performs a complete operating or parking cycle of the system, this cycle including a plurality of distinct, independent operations.

The novel features which are believed to be characteristic of the invention, both as to its organization and method of operation, together with further objects and advantages thereof, will be better understood from the following description considered in connection with the accompanying drawings in which one embodiment of the invention is illustrated by way of an example. It is to be expressly understood, however, that the drawings are for the purpose of illustration and description only and are not intended as a definition of the limits of the invention.

Referring to the drawings:

Figure 1 is a side-view, partly in section, of the automatic storage system illustrated in connection with its application to motor vehicles;

Figure 2 is a plain view of the system;

Figure 3 is a vertical side-view of the system, partly in section, taken along line 3—3 illustrated in Figure 1;

Figure 4 is a side-view of the carriage roller resting on a rail mounted on an elevator platform, the section being taken along line 4—4 illustrated in Figure 1;

Figure 5 is the view of the same roller as that in Figure 4 but resting on a stall rail;

Figure 6 is a front vertical view, partly in section, of the left elevator, this view being taken along line 6—6 illustrated in Fig. 2;

Figure 7 is an enlarged plan view, partly in section, of the front portion of the elevator, this plan view being taken along line 7—7 illustrated in Fig. 6;

Figure 8 is an enlarged vertical sectional view of a portion of the elevator platform and of the pull-in chain and sprockets, this view being taken along line 8—8, illustrated in Fig. 2;

Figure 9 is a transverse vertical view, partly in section, of the sprocket wheel and sprocket chain, the section being taken along line 9—9 illustrated in Fig. 8;

Figure 10 is a plan view of the lower sprocket wheel and sprocket chain, the view being taken along line 10—10 illustrated in Fig. 8;

Figure 11 is an enlarged vertical side view, taken along line 11—11, Fig. 2, partly in section, of a portion of the elevator platform, rails, carriage and the carriage wheel resting on one of the stall rails;

Figure 12 is a horizontal sectional view of the left elevator column and the plan view of a portion of the elevator platform taken along line 12—12 shown in Fig. 6;

Figure 13 is a horizontal sectional view taken along line 13—13, Fig. 6, of the right elevator column and plan view of a portion of the elevator platform;

Figures 18 and 19 are explanatory figures which describe the meaning of the symbols used in Figure 17;

Figure 20 is an additional schematic diagram illustrating more in detail the schematic wiring of the elevator and the pull-in motors.

Figure 21 is an explanatory figure describing the automating parker in a simplified form.

Figure 15:
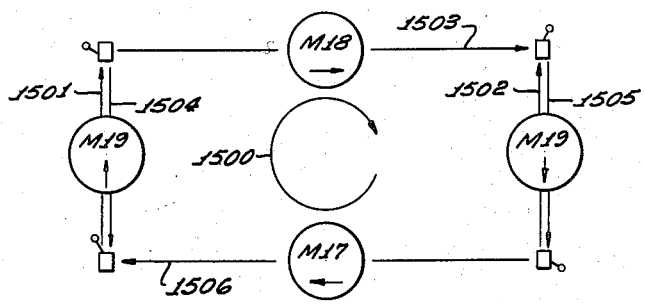
Figures 15 and 16 are explanatory figures illustrating the operating cycles of the automatic parking system.

Before proceeding with a more detailed description of the invention, of its structural elements and of its relay system, it will be helpful first to describe the main elements of the system and its operating cycle, only in general terms for a better and clearer understanding of this invention.

Referring to Fig. 1, the system includes a drive-in elevator 10, an end-elevator 11, a lower stall platform, or parking area, or stall area 12, an upper stall area or platform, or parking area 13, a plurality of carriages, or movable trucks, or flatbeds 14, two elevator platforms 15 and 16, two pull-in motors 17 and 18, and a single elevator motor 19. The entire apparatus of the present invention also includes a stationary frame structure designated in its entirety by the reference numeral 20 mounted on a concrete base 21. The elevators 10 and 11 each include four vertical steel columns, such as front vertical columns 22 and 23, illustrated in Fig. 1, and similar front vertical columns 24 and 25 for the end-elevator 11. Only one rear column is visible in Fig. 3. These columns are mounted directly on a concrete base 21. The top ends of the elevator columns are braced together by the front steel columns 25A and 26 and identical steel beams for the rear columns which are not visible in Fig. 1. The elevator columns 23 and 25 are also used for supporting the upper floor structure or parking or stall area 13. Because of the length of the floor structure 13, additional columns, such as 27 and 28, are also used for supporting the upper floor. The upper floor 13 supports an upper level track 30, and the lower, or ground, floor structure 12 supports a ground, or lower, level track 32. The cross-sectional view of such rail of track 32 is illustrated in Fig. 5. The upper and lower level tracks are directly above each other, and are parallel to each other, the two tracks terminating on one side at the end-elevator 11 and on the other side at the drive-in elevator 10. The plan view of the movable carriages, or trucks, or flatbeds 33, which are used for placing the vehicle in the right stalls, is illustrated in Fig. 2 and their side-view is shown in Fig. 3; their front view is shown in Figures 1 and 6.

The functional cycle of the system is as follows: a vehicle 34 is driven onto the platform of the drive-in elevator 10, and then on top of the carriage 33. The vehicle, therefore, is always received at stall A. A pushbutton 35 is actuated, whereupon the pull-in motor 17 is energized and shifts the cariage 16, with load 34 mounted on the carriage from the elevator platform 16 to a stall B. At the same time the flatbed in stall D is shifted onto the elevator platform of the end-elevator 11. The two elevators 10 and 11 are then automatically energized and elevator 11 lifts load 38 to the upper level. The two elevators 10 and 11 are then de-energized and the upper pull-in motor 18 shifts all the carriages of the stalls F—I, to the left, as viewed in Fig. 1, the direction of travel of the carriages being illustrated by an arrow 42, until load 38 is deposited in stall G. The pull-in motor 18 is then de-energized. It should be noted that when the end-elevator 11 lifts load 38 to the upper level, the drive-in elevator 10 also moves up to the upper level, the two elevators being operated from a single elevator motor 19 which either raises or lowers the two elevator platforms simultaneously. Therefore, the load-carrying carriage in stall I will be shifted from stall I to the elevator platform 16 of the drive-in elevator, whereupon load 41 is deposited in stall A, at the ground level. The lateral or sideways travel of load 34 comes to an end when it reaches stall 3. When this takes place, the two elevators automatically are raised to the second or the upper level. The pull-in motor 18 is then energized for shifting all carriage to the left by the width of one carriage with the result that load 41 is shifted to position J. The two elevators are then lowered and the operating cycle comes to an end. It should be noted here also that the carriage and load 41 previously resting in stall I now have been shifted first onto the elevator platform 33 of the drive-in elevator 10 and then lowered to the ground level. Load 41 is then discharged, and if not, then the cycle is repeated until the position A is left vacant and ready for receiving the next incoming vehicle.

Figure 16:
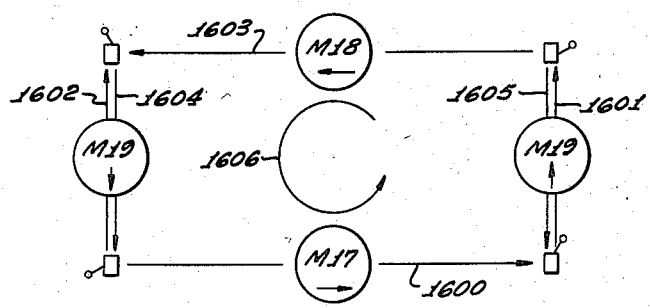
Figure 14:
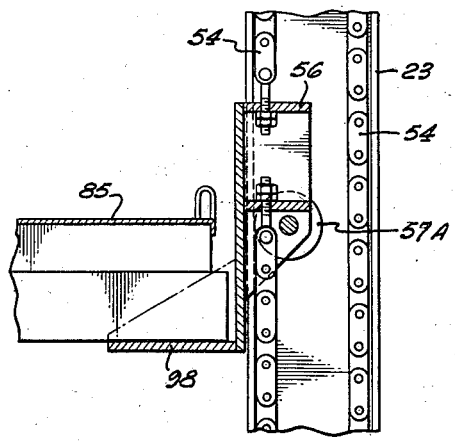
Figure 14 is a section taken along the line 14—14 of Fig. 13.

The above operating cycle is illustrated in a schematic form in Fig. 16. The counter-clockwise horizontal shifting of all carriages on the first floor is illustrated by an arrow 1600. Circle M–17 in the same figure indicates that in order to complete this portion of the cycle, the pull-in motor 17 must be energized. This is followed by the energization of the elevator motor 19, which lifts the two elevator platforms from the lower level to the upper level, which is indicated by an arrow 1601 in Figure 16. The simultaneous upper travel of the elevator 10 is indicated by an arrow 1602. Upon reaching the upper level the two elevators stop and the elevator motor 19 is deenergized. After a predetermined delay period, the pull-in motor 18 is energized and it moves all carriages or flatbeds to the left, and the flatbed on platform 15 from the end elevator 11 to stall G, and the carriage located in stall I is moved to the platform of the elevator 10. This portion of the cycle is illustrated by an arrow 1603. After load 38 reaches stall G, and the carriage from stall I reaches the platform of the elevator 10, the pull-in motor 18 becomes de-energized. This is followed by the energization of the elevator motor 19, which then lowers the two elevators to their normal lower position. This downward travel of the two elevators is illustrated by the arrows 1604 and 1605. This direction of travel of the vehicles around the closed loop shall be referred to here as the "Forward" travel; this is the counter-clockwise travel. The clockwise travel, described below, shall be referred to as the "Reverse" travel.

From the above brief description of the cycle of the automatic parking system, it follows that the load enters the system at the drive-in elevator 10, or stall "A," and then is shifted laterally from stall A to stall B, while load 41 is shifted and lowered to stall A. The system may also be regarded therefore, as having two horizontal paths of travel 1600 and 1603, the lower and the upper paths being co-extensive and lying in the same vertical plane. The two horizontal paths are connected to each other by the two vertical paths 1601—1605, and 1602—1604. As viewed in Figure 16, the travel of load 34 around the rectangular locus of this path is in the counter-clockwise direction, as illustrated by an arrow 1606.

From the examination of the cycle illustrated in Figure 16, it follows that it is also possible to make the load travel around the same rectangular locus in a clockwise direction, which is illustrated by an arrow 1500 in Fig. 15. In this case, the cycle is as follows: after load 34 rests on top of the carriage 33 in elevator 10, or stall A, the elevator motor 19 becomes energized and the two elevators travel from the lower level to the upper level, this travel being illustrated by arrows 1501 and 1502. Load 34 then is shifted laterally from the platform of the elevator 10 (stall J) to stall I by the pull-in motor 18. At the same time, the carriage in stall G is shifted to the platform of elevator 11, which completes the operation of the pull-in motor 18 at this time. This portion of the cycle is illustrated by an arrow 1503 in Fig. 15. Therefore, the pull-in motor 18 becomes de-energized, the elevator motor 19 becomes energized and the two elevator platforms are returned to the lower level, which is indicated by arrows 1504 and 1505. The elevator motor 19 then becomes de-energized, the pull-in motor 17 becomes energized, and motor 17 then shifts the carriage previously deposited on the elevator platform 15 to stall D and the carriage in stall B is shifted to the elevator platform 16, or stall A whereupon the pull-in motor 17 becomes deenergized. This latter step in the cycle is illustrated by an arrow 1506. The above completes the "Reverse" cycle.

From the brief description of the operating cycles of the automatic parking system, it follows that either a clockwise or counter-clockwise operation of the system is possible which increases to a very large extent the usefulness, the flexibility, and the economy of the system. This is so because the clockwise or the counter-clockwise operation of the system enables one to reach and unload or deposit the desired load on the platform of the drive-in elevator 10 in the minimum amount of time. For example, if one wishes to unload the vehicle found in stall B, it is obvious that the clockwise operation of the system will deposit this load in the elevator 10 merely by shifting it from stall B to stall A. If one wishes to unload load 41 in stall I, the counter-clockwise operation will reach this load in the shortest period of time. In this case, the elevators will go up in the manner illustrated by the arrows 1602 and 1601 in Fig. 16, load 41 will be shifted to the platform of the elevator 10 in the manner illustrated by the arrow 1603 and then the elevators will go down, as illustrated by the arrows 1604 and 1605, depositing the load 41 on the ground level at the elevator 10. Therefore, in the cited examples, one single operating cycle of the system enables one to discharge the desired load.

Proceeding now with a more detailed description of the mechanical features of the system, it has been already stated that the main components of the system include two end-elevators 10 and 11 and two level stall areas, one area being at the ground level while the second area is directly above it. In the illustrated example shown in Figure 1 and other figures, there are three stalls 36, 37, and 38, on the first level and three stalls 39, 40, and 41 on the second level. It is possible to park seven vehicles with the aid of the illustrated system. Three vehicles are parked on the ground level, three vehicles are parked on the upper level and one vehicle may be parked in one of the elevators. The system may be increased to any desired extent by increasing the number of stalls on the ground and the upper level. In such case, the stalls may be added in pairs, the addition of one ground level stall requiring simultaneous addition of the upper level stall which is directly above the added ground level stall. For example, if in Fig. 1 the original system had only four stalls, these stalls would have been stalls 36—41, and 37—40. This four-stall system then could be increased by adding stall 38 on the ground level and stall 39 on the upper level, converting this system to the six-stall system.

The two elevators 10 and 11 are identical to each other, and therefore it is only necessary to describe one elevator. As mentioned previously, the elevators function in unison, both elevators being either stationary or moving up or down at the same time. At no time is the operating condition in the cycle such that one elevator is going up while the other is going down. Nor is there any condition at any time when one elevator is stationary while the other is moving. Accordingly, the two elevators are operated from the same elevator motor 19 which is connected to a gear box 44 which reduces the speed of the drive shaft emerging from the gear reduction box 44. This latter shaft is connected to the drive shaft 45 extending through the greater length of the stall structure. The elevator motor 19 and the gear box 44 are mounted on a platform including an I-beam 46 and an additional I-beam and a platform structure not visible in any of the figures. This platform is supported by the vertical columns 27 and 28 which are also used for supporting the upper level stall platform 13. Shaft 45 terminates in gear boxes 46 and 47, illustrated in Figures 1, 2, 6, and 7, only box 46 being visible in Figs. 6 and 7. The boxes 46 and 47 are provided with sprocket wheels, such as sprocket wheel 48 illustrated in Fig. 7. The sprocket wheel 48 is connected by means of a link chain 49 to the sprocket wheels 51 and 52 mounted on a shaft 53, Figs. 6 and 7, which are used for lowering and raising the elevator platform 16 of the drive-in elevator 10. This is accomplished by connecting the sprocket wheel 51 to the vertical elevator chain 54, which is wrapped around the sprocket wheel 51 on top and a sprocket wheel 55 at the bottom. The two ends of the link chain are then connected to an elevator platform bracket 56, which is rigidly connected to one corner of the elevator platform 16. The elevator bracket 56 is also provided with two wheels 57 and 57A (see Fig. 13) which engage one side of the vertical box column 23, and ride up and down this side as the elevator platform 16 is raised or lowered by the elevator motor 19. Examination of Fig. 6 discloses that clockwise rotation of the sprocket wheel 51 will produce a clockwise rotation of chain 54, with the result that the elevator platform 16 will travel in the upward direction until the automatic relay system will stop this travel. Clockwise rotation of the sprocket wheel 51 also produces clockwise rotation of the sprocket wheel 52 and clockwise rotation of an endless chain 58 illustrated in Fig. 6. This in turn will produce a clockwise rotation of a sprocket wheel 59 mounted on shaft 60. This in turn will result in the clockwise rotation of an endless chain 61, which is wrapped around the sprocket wheel 59 at the top and a sprocket wheel 62 at the bottom. This endless chain 61 is connected to an elevator platform bracket 63 which is similar to the elevator platform bracket 56. The bracket 63 is also provided with two wheels 64 and 64A (see Fig. 12) which ride up and down along one side of the vertical column 22. The clockwise rotation of the endless chain 61, therefore, raises the platform 16 of the elevator in the same manner as the clockwise rotation of the vertical endless chain 54. In order to raise the two remaining corners of the elevator platform 16, the horizontal shaft 60 is connected to the sprocket wheel 65 shown in Fig. 2. The sprocket wheel 65 performs the same function as the sprocket wheel 59. The additional connections between the elevator motor 19 and the elevator platform is accomplished by means of a transverse shaft 265, which is connected to shaft 45 through the gear box 46, as illustrated in Figs. 7 and 2. The transverse shaft 265 is connected to a sprocket wheel 66, which drives a link chain 67. The link chain 67 drives three sprockets 68, 69, and 70 illustrated in Fig. 2 which correspond in their function to the three sprockets mounted on shaft 53, Fig. 7, such as sprockets 51 and 52, the third sprocket not being visible in any of the figures. The outer sprocket 68 is connected to a horizontal link chain 170 which functions in the same manner as the horizontal link chain 58, visible in Figures 6 and 7 and, in part, in Fig. 2. The link chain 170 transmits the motive power from shaft 65 and the elevator motor 19 to the sprocket wheel 72 (Fig. 2) mounted on the horizontal shaft 60. Mounted on shaft 60 is a sprocket wheel 65 which performs the same function as the sprocket wheel 59 in Figs. 6 and 7, namely, it is connected to one corner of the elevator platform 16 and it moves (the upper left corner as viewed in Fig. 2) the elevator platform up and down in the same manner as the endless chain 61. The same up and down movement is also obtained at the upper right corner of the elevator platform (as viewed in Fig. 2) by means of an endless chain wrapped around sprocket wheel 69. The functioning of the elevator drive therefore, may be summarized briefly as follows: the motive power from motor 19 is transmitted by means of link chain 74, Fig. 2, to a gear box 44 which is connected to shaft 45. This shaft rotates four sprocket wheels 52, 59, 65, 69 which either lower or raise the elevator platform 16, depending on the direction of rotation of motor 19.

The same mode of operation is obtained at the end elevator 11, the platform 15 of which is connected to motor 19 through shaft 45 (see Fig. 2), a transverse shaft 75, endless link chains 76 and 77, endless horizontal link chains 78 and 79 and vertical link chains 80, 81, 82 and 83, the four vertical link chains raising and lowering the elevator platform in the same manner as in the case of the elevator platform 16.

The elevator platforms 15 and 16 are each provided with four plates 84, 85, 86, 87, 88, 89, 90, 91 having serrated upper surfaces for enabling one to drive the vehicle on top of the elevator platforms 15 and 16. Each platform includes a rectangular frame made of angle steel beams, such as transverse beam 92 illustrated in Fig. 6 and a plurality of longitudinal angle iron beams, such as beams 93, 94, 95 and 96 visible in Figs. 7 and 3. This platform is attached to the elevator brackets such as the elevator brackets 56 and 63, Fig. 6, by means of additional corner brackets 97 and 98 which are also illustrated in Figs. 3 and 6. The elevator platforms are provided with carriages 33 which are best illustrated in Figs. 1, 2, 3, 6, 4, 5, and 11. The carriages include base frames composed of transverse members 101, 102, 103, and 104 and a plurality of longitudinal members such as member 106 illustrated in Fig. 3. On top of these transverse and longitudinal members rest two drive-on apron or plate members 107 and 108 best seen in Figs. 1 and 2, which are provided with two recess portions 109 and 110 for proper positioning or centering of the vehicle on the carriage by providing these two recesses for the two wheels of a vehicle. The carriage is provided with a plurality of rollers or wheels, such as wheels 111, 112, 113, and 114, visible in Fig. 2 and partially visible in Figs. 1, 3, 6, 4, and 5. The cross-sectional view of these wheels is illustrated on an enlarged scale in Figs. 4 and 5.

Referring to Figs. 4 and 5, Figure 4 illustrates an end view of the carriage wheel 400 attached to the carriage angle iron members 401 and 402 by means of a pin 403, which is held in a fixed transverse relationship with respect to the angle irons by means of washers 405 and 406. Figure 4 also illustrates a U-shaped track member 408, which is mounted on the elevator platform such as elevator platform 15 or 16. These U-shaped members are also visible in planned view in Figure 2 where they appear as members 408 and 409. Figure 5 illustrates the same roller or wheel 400 illustrated in Fig. 4 but in the cross-sectional view of the same wheel, when this wheel rests on track 30 having an inverted V or triangular cross-section. This V-shaped track member 30 is also visible in Fig. 2. Examination of Fig. 2 discloses that this V-shaped track extends from the right end of the U-shaped members 408 and 409 through the entire length of the stall areas and up to the left end of the U-shaped track members 200 and 201 best seen in Fig. 2. There are two V-shaped tracks in the system. The first one is on the ground level and the second one is on the upper level. The two tracks have the same length, same width, are co-extensive, and the two vertical pairs of rails lie in the same two vertical planes. The longitudinal axis of the V-shaped track 30 and the longitudinal axis of the U-shaped member 408 lie in the same vertical plane illustrated by lines 429 in Figures 4 and 5. Accordingly, when roller 400 rolls off the U-shaped member 408, it immediately engages the V-shaped member 30 in a manner illustrated in Fig. 5. Rollers 400 have the V-shaped configuration in order to facilitate proper alignment of the carriages with the tracks 30 on the ground and upper levels of the two storage areas. In order to facilitate such alignment, the outer ends of the tract members 30 are shaped so as to have cone-shaped portions which have a narrower base than the base of the V-shaped portions illustrated in Fig. 5. Accordingly, although no large misalignments need be present between the elevator carriages 15 and 16 and track 30, the disclosed construction of the tracks permits a reasonably large misalignment between track member 408 and track member 30 without necessarily producing malfunctioning and jumping of tracks by the carriages when they are moved off the elevator platforms onto the tracks 30, and vice-versa. These ends of the U-shaped members 408, which are adjacent to the V-tracks 30, are provided with the flared ends (not illustrated) for guiding rollers 400 onto the U-shaped members when rollers 400 roll off tracks 30 and onto the U-shaped tracks 408. This takes place when the carriages are moved from the stall positions onto the elevators. The side view of the U-shaped member, such as member 408, Fig. 4, and the V-shaped track member 30, is illustrated in Fig. 11. The same figure also illustrates the position of a roller 400 similar to roller 400 illustrated in Figs. 4 and 5. Fig. 11 illustrates that normally the U-shaped tracks 408 are slightly above tracks 30 when no load rests on tracks 408. This is so because the elevator platforms are provided with impact cushioning springs (not visible in any of the figures) for cushioning the platforms from excessive jarring the platforms strike the concrete base. When the carriage rolls off the elevator platform, the springs expand and slightly raise the elevator platform. The reverse is true when the carriage rolls off tracks 30 and engages tracks 408.

Before completing the description of the elevator structures, it would be proper to mention at this time that the elevators are provided with the limit switches 116, 117, 118, and 119. The limit switches 116 and 119 stop the elevator motor 19 and simultaneously apply brakes to gears 44 or the elevator motor 19 when the elevator platforms actuate the switches. The limit switches 117 and 118 disconnect the elevator motor after the elevator platforms reach the proper level.

The automatic parking system is provided with two pull-in motors 17 and 18, which are used for lateral or sideways shifting of motor vehicles in the manner described in connection with Figs. 15 and 16. It may be recalled that it has been stated previously in connection with the introductory description of the operating cycle of the system, that the motor vehicles may be transported either in the clockwise or counter-clockwise directions, around the loop which include the lower and upper stall areas. Accordingly, the pull-in motors 17 and 18 can be energized so as to shift or pull the carriages from left to right or from right to left as viewed in Fig. 1. The automatic actuation of the pull-in motors 17 and 18 will be described more in detail in connection with the description of the relay system. Therefore, the description given below will be restricted primarily to the description of the mechanical elements of the pull-in motor system.

The two pull-in systems are identical, and therefore only the description of one will suffice. The side view of the pull-in motors 17 and 18 is given in Fig. 1 and also, on an enlarged scale in Fig. 6. The pull-in motor system is also visible in its plan view in Fig. 2 and its transverse vertical view is also illustrated in Fig. 3 for the upper level stall area. The details of the sprocket and chain systems is illustrated in Figs. 8, 9, and 10. Referring first to Fig. 1, the ground level pull-in motor 17 is mounted on the concrete base 21 or the lower stall platform 12, while the upper pull-in motor 18 is mounted on the upper stall platform 13. The upper pull-in motor 18 drives two transverse shafts 122 and 123, which are best seen in Fig. 2, shaft 122 is also visible in Figs. 3 and 8. The motor is connected to the transverse shaft 122 by means of a sprocket chain or a V-belt 124, Fig. 6, a gear box 125, a sprocket chain 126 Figs. 2 and 3, interconnecting the gear box 125 with a sprocket wheel 120 mounted on shaft 122, which completes the connections between the motor 18 and the shaft 122. Shaft 122 is also illustrated in Fig. 8 which also shows a sprocket wheel 127 mounted on shaft 122. The sprocket wheel 127 drives a horizontal endless link chain 128 which extends from the left end of the upper stall area through the right end of the same stall area in the manner best seen in Figs. 2 and 8. The link chain 128 has a plurality of chain links 129 and a plurality of pins 130 which interconnect the chain links 129. An identical sprocket wheel-link chain structure is also used at the lower level. Figs. 9 and 10 illustrate, respectively, the vertical sectional view and the plan view of the ground level sprocket wheel 132 (see Fig. 8), and the description that follows relates to the upper sprocket wheel 127 as well as the lower sprocket wheel 132. Each chain pin 130 and 134 has an extension 131 which will be called here as drive pin. These chain pins and drive pins are best seen in Figs. 9 and 10. Fig. 9 illustrates the side of view of the chain and drive pins, while Fig. 10 illustrates the plan view of the same pins. Since the pins are cylindrical, their side views and plan views are identical.

Examination of the same structure for the ground level which includes the sprocket wheel 132, a link chain 133, and the pins 134 discloses the fact that the drive pins 131 engage vertically positioned drive bracket teeth 136 and 137 to the right and left ends of the carriages 33. This is best illustrated in Figs. 8, 9, 10, and 3. In Fig. 8 the right end of carriage 33A, as viewed in Fig. 8, is provided with the drive bracket 135 having drive teeth 136 and 137. The same figure also illustrates a carriage 33B which is provided with a drive bracket 140 at the left end of carriage 33B. The drive bracket 140 is provided with two drive teeth 141 and 142 which are engaged by drive pins 143 and 144, respectively. The drive teeth 141 and 142 are spaced so as to permit a free, sliding engagement between the drive pins 143 and 144 and the drive teeth 141 and 142 respectively. Two drive teeth, such as teeth 136 and 137 on the drive bracket 135, and also two drive teeth 141 and 142, on the drive bracket 140, are used on each drive bracket because it permits an immediate engagement between the two drive plates and the two drive teeth in the manner illustrated in the lower portion of Fig. 8. The result is that the sprocket wheels 127 and 132 can shift the carriages 33A, 33B, 33C, and 33D either in a clockwise or a counter-clockwise direction without any loose motion between the drive teeth and the drive pins. Examination of Fig.

8, and especially of the construction of the sprocket wheel assembly 132, also discloses that each carriage will be engaged by the horizontal link chain 133 at two adjacent ends of each carriage since each end of the carriage is provided with the drive bracket, such as brackets 135 and 140, bracket 135 being the right end bracket for the carriage 33A and bracket 140 being the left end bracket for the carriage 33B. Since shaft 122 is also connected to the second horizontal link chain 148 (see Fig. 2), it follows that each carriage will be driven or pulled either to the left or to the right by means of the two link chains 128 and 148 at the upper level and the identical link chains at the lower level, such as the link chain 133. Therefore, each carriage has four drive brackets each of which is engaged by the horizontal drive chain. The two horizontal link chains, such as 128 and 148, first engage the two right end brackets in the manner illustrated in connection with the bracket 135, Fig. 8, and then the same link chain also engages the two pull-in brackets of the same carriage located at the opposite end of the same carriage. This latter bracket and the type of engagement formed between such bracket and the link chain is fully illustrated in Figs. 8, 9, and 10 in connection with the carriage 33B and the left end bracket 140 which obviously is identical to the left end bracket for the carriage 33A, if the latter were visible in the drawing. Accordingly, the pull-in chains form positive engagements with the four corners of each carriage. This is an important consideration because it permits the two pull-in chains, such as chains 128 and 148 (see Fig. 2) to move the carriages in either direction either from left to right or from right to left, in the manner illustrated by arrows 1503, 1600, and 1506 and 1603 in Figs. 15 and 16. The above increases positive engagement between the two horizontal link chains and the carriages; it also prevents any possibility of misalignment between the carriage, the link chains, and the tracks such as tracks 30 and 408. This is especially so because the drive brackets have two drive plates on each bracket and have four drive brackets for each carriage. Therefore, there is an engagement between the link chains and the carriage at the four corners of the carriage and each of these engagements is a positive engagement because there is only a limited amount of play between the drive teeth, such as drive teeth 143 and 144 and the drive plates 141 and 140. To insure still further the proper alignment, the horizontal drive chains 133 and 148 are very carefully aligned throughout their lengths and with respect to each other because both chains are driven from the same shaft 122 at one end and are also kept in aligned condition at the other end of the chains by means of a common transverse shaft 123, the two transverse shafts and the sprocket wheels such as sprocket wheel 127 and the three additional wheels performing the same function. In other words, the shaft 123, the sprocket wheel mounted on this shaft, and the link chains will engage or disengage the drive brackets and the drive teeth in the same manner as the corresponding elements actuated by shaft 122. Because of such construction of the pull-in system, it can function with equal effectiveness while pulling or shifting the vehicles either from left to right or from right to left along the stall areas.

Four limit switches 150, 151, 152 and 153 are provided for controlling the operation of the pull-in motors 120 and 121. Switch 150 de-energizes the pull-in motor 120 when the carriage originally found in stall 36 is shifted onto the elevator platform 15.

*Schematic straight-line diagram of the relay system for the automatic parking system*

The disclosed automatic parking system uses two pull-in motors 17 and 18 and a single elevator motor 19. From the prior description of the operating cycle of the system it follows that only one motor is operating at any given time when the system is set into operation. This is necessary since the flatbeds are circulated around the vertical loop having two horizontal paths and two vertical paths. The travel of the flatbeds is arranged so that they travel either in a clockwise or a counter-clockwise direction around the rectangular loop. This means that if one is to consider the forward travel which corresponds to the counterclockwise rotation as viewed in Figs. 1 and 21, such travel must begin with the actuation of the ground floor pull-in motor 17 which will pull the flatbed of the elevator platform 16 and at the very same time transfer one of the platforms from stall D to stall E. It then becomes necessary to deposit the flatbed off the elevator platform 15 which requires de-actuation of the ground floor pull-in motor 17 and subsequent activation of the elevator motor 19. It also should be noted that the pull-in motor must be allowed to run only that period of time which advances the flatbeds on the first floor from left to right by the width of one stall, the width of the elevator platforms 16 and 15 being also equal to the width of the stalls. Immediately after such shift to the right of the flatbeds, the pull-in motor 17 must be stopped.

The next step is to lift the two elevators from the ground floor to the second floor, and upon accomplishing this step the elevator motor 19 must be disconnected with the elevator platforms remaining at the level of the second floor.

This permits the next step to take place, which consists of the actuation of the second floor pull-in motor 18 which shifts all the flatbeds in the second floor stall area from right to left, including the flatbed that is on platform 15 of the second elevator. This latter flatbed is shifted to stall G and the flatbed in stall I is shifted to the platform 16 of the first elevator. After the second floor pull-in motor 18 accomplishes this step, it must be disconnected, which prepares the parking system for the next step of its operating cycle.

This next step consists of simultaneously lowering the two elevators from the second floor to the ground floor, which means that the elevator motor 19 must be connected once more to the source of power and disconnected after the elevator platforms reach the floor level.

This completes the operating cycle of the system when the flatbeds are shifted in the counter-clockwise direction around the loop.

A comparable cycle can be also repeated around the same loop but in the clockwise direction. The number of steps in the forward and the reverse cycles obviously is the same but the reverse cycle must begin with the actuation of the elevator motor 19 for raising the elevators from the ground floor to the second floor, which is then followed by the actuation of the second floor pull-in motor 18, which shifts the flatbeds on the second floor from left to right. This is followed by the lowering of the elevators and shifting of the flatbeds from right to left on the first floor, which completes the reverse cycle.

From the above description of the operating cycle and the sequence of connecting and disconnecting the three motors it follows that a relay system for automatically controlling such sequential connecting, disconnecting, and timing of the operating steps of the overall system must have a plurality of relay channels which connect and disconnect the motors in accordance with the above mentioned sequence. Additional timing relay channels also must be provided for proper timing of the operation, and it is also necessary to have lock-out relay systems for disconnecting all other relay channels by the one which is in operation.

Figure 17:
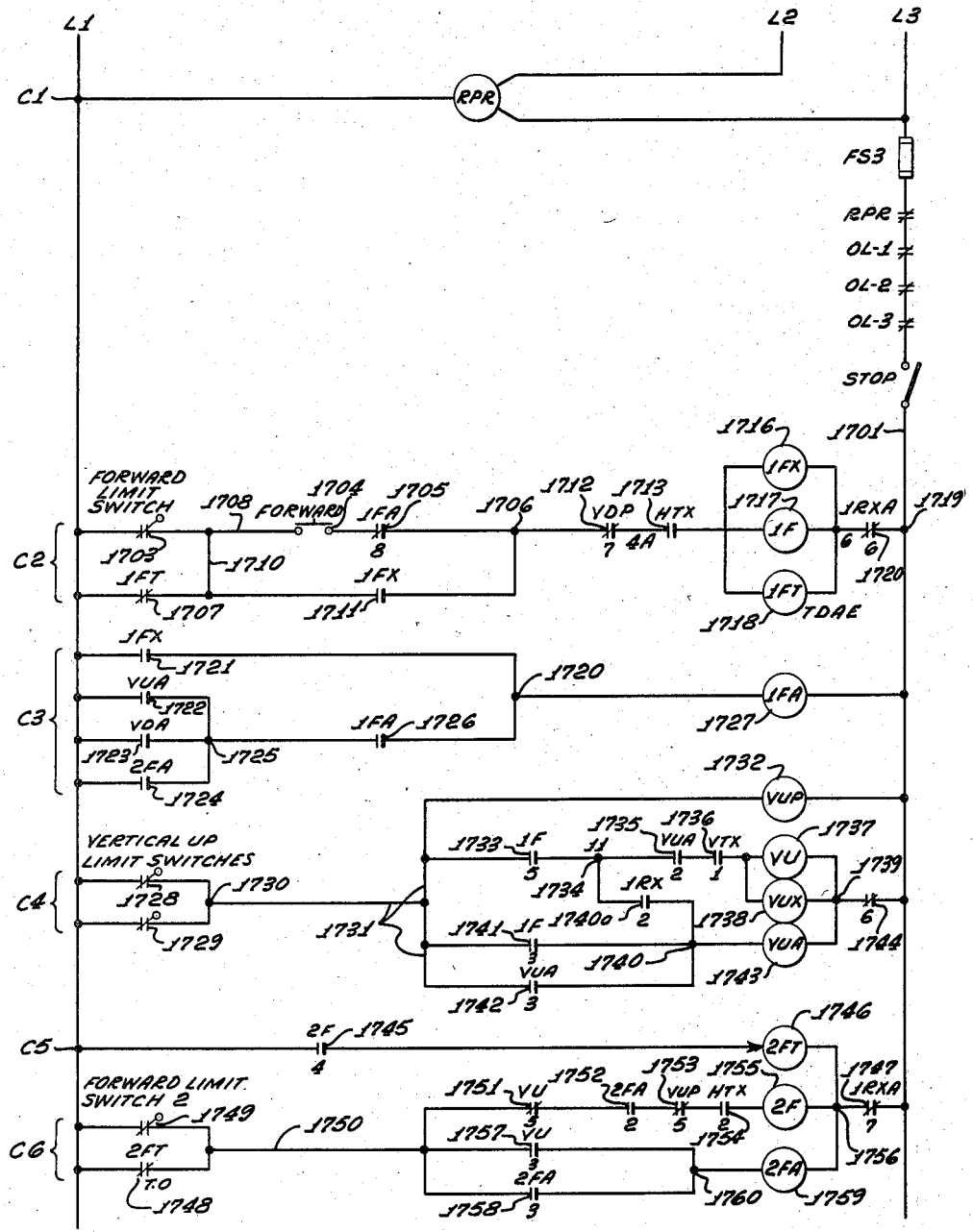
Figures 17 and 17a are a schematical diagram of the relay system.
Figure 17A:
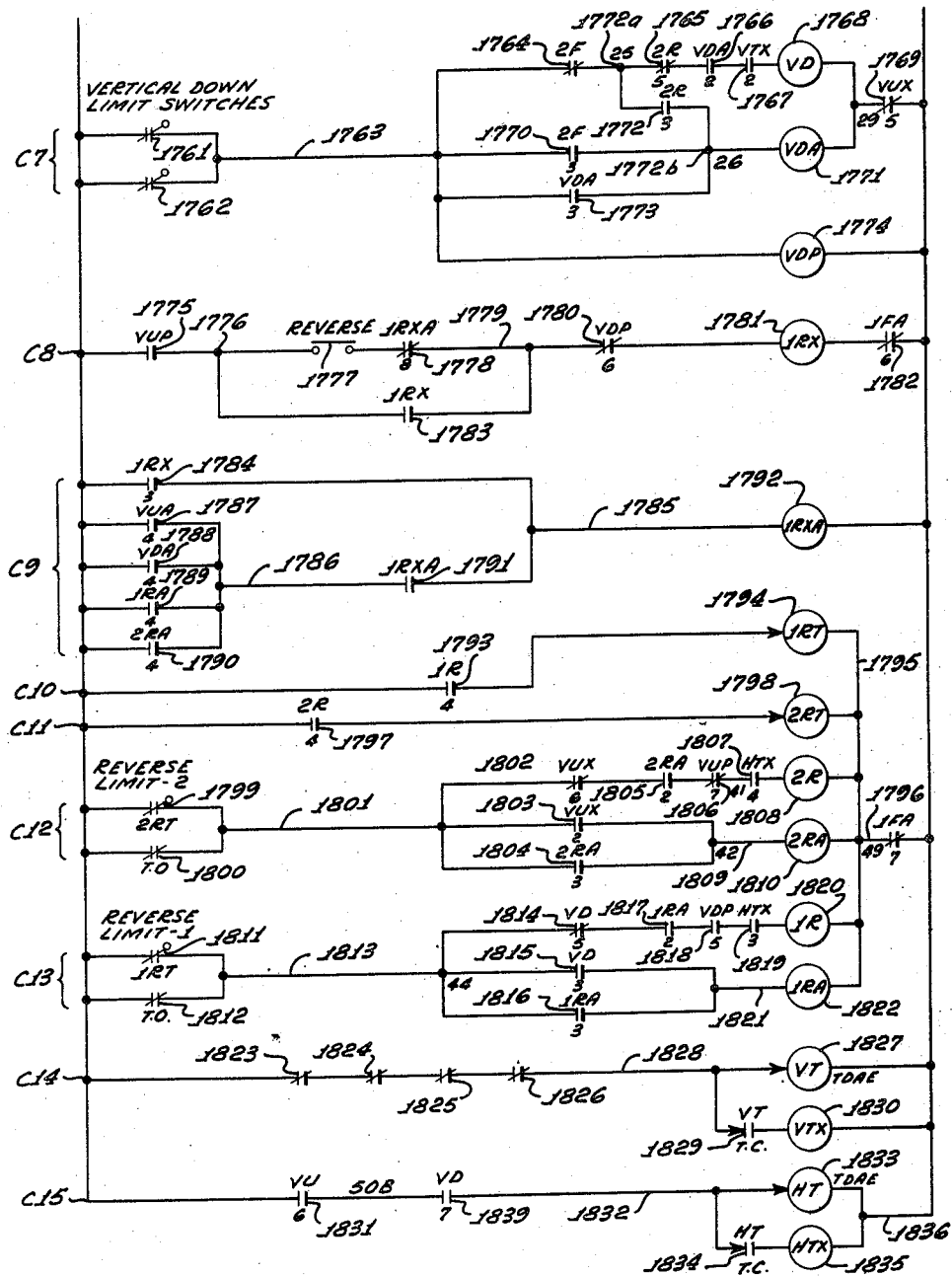

Such a system is disclosed in Figs. 17 and 20. The description of the channels and of the connections within the respective channels will be given first and this will be followed by the description of the functional cycle of the relay system as well as of the entire automatic parking system for the forward and the reverse cycles of the system.

Fig. 17 is the straight-line diagram of the relay system used in connection with the automatic parking system. The relay system actuates and deactuates the two pull-in motors 17 and 18 and the elevator motor 19. The symbols used in the diagram are of the type used in the elevator art and are indicated and defined in Figs. 18 and 19. The motor connections are illustrated in Fig. 20, and the block diagram of the system is illustrated in Fig. 21.

Referring to the Figs. 17, 20, and 21, the motors 17, 18, and 19 are connected to a source of three-phase power indicated by lines L1, L2, and L3 in Figs. 17 and 20, the motors being illustrated in Fig. 20. The relay system is connected across the two lines L1 and L3, the connections and the type of the relays, switches, etc. used in the system being as follows:

The two control busses in Fig. 17 are busses 1700 and 1701. Bus 1700 is connected to line L1 through a fuse FS1 and bus 1701 is connected to line L3 through a fuse FS3, a normally closed, manually operated stop switch 1702, normally closed overload relay contacts OL–1, OL–2, OL–3 and normally closed contacts RPR of a reverse phase and phase failure relay RPR. Relay RPR is connected across the three phases L1, L2, and L3 in order to protect the three drive motors from loss of phase and phase reversal. If there is any loss of phase or phase reversal, contacts RPR open and deenergize the entire control system. This, in turn, deenergizes relays 1F, 1R, 2F, 2R, VU or VD, disconnecting the three motors from the three-phase lines L2, L3, and L1; the above relays are illustrated in Fig. 17 and their contacts are illustrated in Figs. 17 and 20. Only one set of contacts is normally closed in Fig. 20 at any given time. For "forward" rotation of the motors contacts 1F, 2F, and VU are closed. Such rotation of the motors corresponds to the "forward" movement of the carriages or flatbeds, as indicated in Fig. 21; it also corresponds to the upward movement of the elevator platforms 16 and 15. Travels in the opposite directions are obtained by opening contacts 1F, 2F, and VU, and closing contacts 1R, 2R, and VD by energizing the similarly numbered relay.

The relay system illustrated in Figs. 17 and 20 has eighteen individual circuits C1 through C18 designated in the figures, and in order to facilitate the description of the system, the connections of each circuit will be described first, which will be followed with the description of the functioning of the system.

*Circuit C2, first floor forward motion circuit.*—This circuit includes normally closed contacts 1703, also designated as "For. Lim.–1," which are opened when the forward limit switch 150, Figs. 1 and 21, is opened by a carriage or flatbed, such as flatbed B in Fig. 21. Contacts 1703 are connected in series with a normally open "Forward" push button 1704 and normally closed contacts 1705 of the 1FA relay whose coil 1FA is connected in series with the control circuit C3. Contacts 1705 are also designated as contacts #8 of relay 1FA, which is a multi-contact relay. Normally closed contacts 1707 (1FT–T. D.) is connected in parallel with contacts 1703 and a line 1708 is connected to a line 1709 by a shunt connection 1710. Normally open contacts 1711 (#1 contacts of relay 1FS) are connected in series with conductor 1709 and a junction point 1706. The junction point 1706 is connected to normally closed contacts 1712 which correspond to the closed contacts #7 of the multi-contact relay VDP whose coil is connected in series with the control circuit C7; contacts 1712 are connected in series with normally open contacts 1713 which correspond to contacts #1 of the horizontal motion auxiliary timing relay HTX whose coil is connected in series with the control circuit C15. Contacts 1712 and 1713 are connected, therefore, in series between junction points 1706 and 1714. Three relay coils, 1716 (1FS), 1717 (1F), and 1718 (1FT) are connected in parallel between junction points 1714 and 1715. Junction points 1715 and 1719 are connected to each other through normally closed contacts 1720 which are contacts #6 of the 1RXA relay whose coil is connected in series with the control circuit C9.

*Circuit C3, first floor forward motion maintaining circuit.*—This circuit includes normally open relay contacts 1721 connected on one side to bus 1700 and on the other side to a junction 1720. These contacts correspond to contacts #2 of relay 1FX whose coil is connected in series with the control circuit C1 between junctions 1714 and 1715. Three normally open contacts 1722, 1723, and 1724 are connected in parallel between bus 1700 and junction 1725 which in turn is serially connected with normally open contacts 1726. Contacts 1726 are connected in series between junctions 1725 and 1720. Contacts 1722 correspond to contacts #1 of relay VUA whose coil is connected in series with the control circuit C4. Contacts 1723 correspond to contacts #1 of relay VDA whose coil is in control circuit C7. Contacts 1724 correspond to contacts #1 of relay 2FA whose coil is in control circuit C6. A relay coil 1727 is connected in series between junction 1720 and bus 1701.

*Circuit C4, vertical upward motion for two elevators.*—Two normally closed elevator switches 1728 and 1729 are connected in parallel between bus 1700 and a junction 1730 formed by a common conductor 1731. These elevator switches correspond to the vertical travel limit switches 117 and 118, Figs. 1 and 21, which stop the elevator motor 19 after platforms 16 and 15 reach the upper desired limit of their travel and, at this point, actuate the two switches into an open position, as indicated by dotted lines 16a and 15a in Fig. 21.

The common conductor 1731 is connected to four parallel circuits which are as follows: The first circuit includes the coil of a relay 1732 which is the VUP relay, these letters standing for vertical upward protective relay, which protects the elevator motor from any overload. The contacts operated by this relay are the VUP contacts #5 in circuit C6, also designated as contacts 1753, and the VUP contacts #2 in circuit #8. The second circuit includes the normally closed contacts 1733 (contacts #5 of relay 1F), open contacts 1735 (contacts #2 of relay VUA), 1736 (contacts #1 of relay VTX), relay coil 1737 (VU), and normally closed contacts 1744 (contacts #6 of relay VD), connected between a common conductor 1739 and bus 1701. A coil 1738 of the auxiliary relay VUX is also connected in parallel with the coil 1737 of the main relay VU. The third circuit includes serially connected normally open contacts 1741 (contacts #3 of relay 1F) and a coil 1743 of the VUA relay, which is the vertical upward travel auxiliary relay. A normally open set of contacts 1740a is connected between junction points 1734 and 1740, which correspond to contacts #2 of the 1RX relay, or the reverse motion relay, auxiliary to the main reverse motion relay 1R designated as the relay 1820 in circuit C13. The coil 1RX is coil 1781 in circuit C8. Normally open contacts 1742 are connected between conductor 1731 a junction 1740, contacts 1742 corresponding to contacts #2 of VUA relay, or vertical upward (travel) auxiliary relay, which controls the vertical upward travel of the elevator platforms 16 and 15, together with the relays VU (1737) and VUX (1738) in the same circuit C4.

*Circuit C5, second floor forward motion maintaining circuit.*—This circuit includes normally open contacts 1745 of a relay 2F in circuit C6 (see relay 1755) and a coil 1746 of a timing relay 2FT. The circuit is completed between busses 1700 and 1701 through normally closed contacts 1747 which are contacts #7 of the 1RXA relay whose coil 1791 is in series with the control circuit C9.

*Circuit C6, second floor forward motion circuit.*—This circuit begins with normally closed contacts 1749 of the forward limit switch #2, which corresponds to the switch 152 in Figs. 1 and 21. The switch is connected on one side to bus 1700 and on the other side to a common conductor 1750 which is also connected to bus 1700 through normally closed contacts 1748 of the 2FT relay, the contacts being the "T. O." contacts, or contacts which have "timed opening" after deenergization of coil 2FT which is connected in series with circuit C5.

The common conductor 1750 is connected to three parallel circuits. The first circuit includes serially connected normally closed contacts 1751 of the vertical upward movement relay VU (1737) in circuit C4; normally open contacts 1752 of relay 2FA (1759) in the lower branch 1760—1756 of the same control circuit C6; normally closed contacts 1753 of a relay VUP, open contacts 1754 of relay HTX in circuit C15; and coil 1755 of relay 2F. The second parallel circuit includes the normally open contacts 1757 of relay VU, and the third circuit includes the normally open contacts 1758 of relay 2FA. The second and third circuits join at junction 1760 which is connected to a coil 1759 of a relay 2FA. The other lead of the relay coil 1759 is connected to a junction point 1756. From the above description it follows that the normally closed contacts 1747 of the relay 1RXA are in series with circuit C5; contacts 1747 are also in series with the first branch VU–2F, the second branch VU–2FA, and the third branch including contacts 1758–2FA and coil 1759–2FA.

*Circuit C7, vertical downward motion for two elevators.*—This circuit includes the parallelly connected switches 1761 and 1762 which are the vertical, down movement limit switches 116 and 119 illustrated in Figs. 1 and 21 which stop the elevator motor 19 and also stop the downward travel of the elevator platforms 15 and 16. The limit switches are connected to a common conductor 1763 which is connected to four parallel, or at least parallel-in-part, circuits which are as follows. The upper circuit, as viewed in Fig. 17, includes the normally closed contacts 1764 and 1765 of the relay 2F and 2R, respectively, the open contacts 1766 and 1767 of the relays VDA and VTX and a coil 1768 of a VD relay. The second parallel circuit includes the normally open contacts 1770 of relay 2F and a coil 1771 of a relay VDA. Normally open contacts 1773 of a relay VDA are connected between the common conductor 1763 and junction 1772b. A coil 1774 of a relay VDP is connected between the common conductor 1763 and bus 1701.

*Circuit C8, reverse cycle initiating circuit.*—This circuit includes the series circuit of the following: the normally open contacts 1775 of a relay VUP, a reverse movement push button 1777, normally closed contacts 1778 of a relay 1RXA, normally closed contacts 1780 of a relay VDP, the coil of a relay 1RX and normally closed contacts 1782 of a relay 1FA. Normally open contacts 1783 of a relay 1RX are connected between junction 1776 and junction 1779.

*Circuit C9, reverse cycle maintaining circuit.*—The following normally open contacts are connected to bus 1700:

| Contact number: | Relay number |
|---|---|
| 1784 | 1RX |
| 1787 | VUA |
| 1788 | VDA |
| 1789 | 1RA |
| 1790 | 2RA |

Contacts 1787 through 1790 are connected on one side to bus 1700 and to a common conductor 1786 and normally open contacts 1791 of a relay 1RXA, then to a conductor 1785, a coil 1792 of the relay 1RXA and finally bus 1701. Contacts 1784 are connected between bus 1700 and conductor 1785.

*Circuit 10, first floor reverse cycle maintaining circuit.*—This circuit includes normally open contacts 1793 of relay 1R and a coil 1794 of a timing relay 1RT, connected to a conductor 1795. Conductor 1795 is connected through the normally closed contacts 1796 of a relay 1FA whose coil is in circuit C3.

*Circuit 11, second floor reverse cycle maintaining circuit.*—This circuit includes serially connected normally open contacts 1797 of relay 2R whose coil is in circuit C12, and a coil 1798 of a timing relay 2RT connected on the other side of the common conductor 1795.

*Circuit 12, second floor reverse motion circuit.*—This circuit includes a limit switch 1799 which corresponds to the reverse limit switch 153 in Figs. 1 and 21. Normally closed contacts 1800 of a timing relay 2RT, with timed opening of those contacts ("T. O."), are connected in parallel with the limit switch 1799. The limit switch 1799 and contacts 1800 are connected between bus 1700 and a common conductor 1801 which is also connected to three parallel circuits which are as follows: the first circuit includes the normally closed contacts 1802 of a relay VUX which has its coil in circuit C4, normally open contacts 1805 of relay 2RA whose coil is in the parallel branch of this circuit (see coil 1810), normally closed contacts 1806 of relay VUP whose coil is in circuit C4, normally open contacts 1807 of relay HTX whose coil is in circuit C15, and coil 1808 of relay 2R the other lead-wire of which is connected to the common conductor 1795. The second parallel circuit includes normally open contacts 1803 of relay VUX whose coil is in circuit C4, contacts 1803 being connected between conductor 1801 and a conductor 1809; the third circuit includes normally open contacts 1804 of relay 2RA whose coil 1810 is connected in series with the contacts 1803 and 1804 by being connected between conductors 1809 and 1795. The circuit of the above three parallel circuits is completed to bus 1701 through the contacts 1796 of relay 1FA.

*Circuit C13, first floor reverse motion circuit.*—This circuit has a normally closed reverse limit switch 1811, which is the reverse limit switch 151, and normally closed contacts 1812 of the timing relay 1RT with timed opening of these contacts. Switch 1811 and contacts 1812 are connected in parallel between bus 1700 and a conductor 1813. Conductor 1813 is connected to conductor 1795 through the following two circuits: the first circuit includes the following normally closed contacts: 1814 of relay VD; 1817 of relay 1RA; 1818 of relay VDP; the normally open contacts 1819 of relay HTX and finally a coil 1820 of relay 1R. The second parallel circuit includes two parallel branches with normally open contacts 1815 and 1816 of the relays VD and 1RA, respectively, these parallel branches being connected to a common conductor 1821 and then, serially, through a coil 1822 of relay 1RA to the common conductor 1795.

*Circuit C14, vertical motion interlocking channel preventing horizontal motion a predetermined interval of time after vertical motion ceases.*—This circuit is a series circuit including normally closed contacts 1823, 1824, 1825 and 1826 of the relays 1F, 2F, 1R, and 2R, respectively, and a coil 1827 of a timing relay VT with timing delay after energization of coil 1827 ("TDAE"). Coil 1827 is connected in shunt with a circuit including normally open contacts 1829 of timing relay VT with timed closing ("T. C.") of these contacts after coil VT becomes energized; these contacts are connected in series with the winding, or coil, of relay VTX, which is also a timed operation relay.

*Circuit C15, horizontal motion interlocking channel preventing vertical motion a predetermined interval of time after horizontal motion ceases.*—This circuit includes serially connected normally closed contacts 1831 of relay VU, a normally closed contact #7 of relay VD, conductor 1832, the coil 1833 of the timing relay HT with timing delay after energizing ("TDAE"), and conductor 1836. Coil 1833 is shunted by normally open timed contacts 1834 of the timing relay 1833 (HT) and a coil 1835 of the auxiliary timing relay HTX.

*Circuits 16, 17, and 18, first and second floor pull-in motor circuits and elevator motor circuits.*—These circuits are those for the pull-in motors 17 and 18 and for the elevator motor 19. All circuits are identical in their nature, and, therefore, description of one circuit will suffice. The motors are three-phase motors of squirrel cage type. The three phase windings of the motors are connected to the three phase line L1, L2, L3 in the manner indicated in Fig. 20. Line L1 is connected directly to the motor winding, while lines L2 and L3 are connected to the remaining two windings through overload heaters, such as heaters OL-1, and through normally open contacts 2000 and 2001 of the 1F relay ("F" meaning "forward") and normally open contacts 2002 and 2003 of the 1R ("R" meaning "reverse") relay. Either contacts 2000 and 2001 or 2002 and 2003 are closed at any given time. When contacts 2000 and 2001 are closed, motor 17 revolves in one direction, and the direction of its rotation is reversed when the contacts 2000 and 2001 are opened and contacts 2002 and 2003 are closed.

The same mode of operation takes place when similar contacts are closed and opened in the circuits of the motors 18 and 19.

*Sequence of operation of the automatic parker control system*

The sequence of operation for the control relay system disclosed in Figs. 17–21 is as follows.

The control system is arranged to provide for two separate cycles of operation, "Forward" and "Reverse." Forward operation is defined as that operation which will provide a horizontal motion from left to right for the lower layer of parking flatbeds or carriages A through D, Fig. 21, and from right to left for the upper layer of flatbeds, or carriages G through I as viewed in Figs. 1 and 21. The reverse motion is defined as that motion in a horizontal direction from right to left for the lower layer of the A—D flatbeds or stalls A—D and from left to right for the upper layer of the flatbeds or stalls I—G.

The control equipment illustrated in Figs. 17 and 20 consists of a group of multi-pole relays and contractors which set up the proper sequences of operation for each cycle and apply operating voltage to the proper motor when it is desired to move the flatbeds. The control equipment illustrated in Fig. 17 can be mounted as an integral part of the storage structure, Fig. 1, or it may be located remotely. The control system is connected with the various devices noted on the storage structure, such as the three motors 17, 18, 19 and the limit switches 116, 117, 118, 119, 150, 151, 152 and 153 by means of electrical wiring. The push button stations 35—36, Figs. and 21, which initiates operation of the equipment, may be located on the storage structure, as in Fig. 1, or at some remote location.

The sequence of operation for the forward direction is as follows:

It is assumed that the parking system is at rest with flatbeds located at points A, B, C, D, G, H and I illustrated in Fig. 21. The person operating the system presses the "Forward" push button 36. This energizes the coil circuits of relays 1716, 1717 and 1718 (1FX, 1F and 1FT) through the normally closed #8 contact 1705 of relay 1727 (1FA) the normally closed #7 contact 1712 of relay 1774 (VDP) and the normally open #1 contact 1713 of relay 1835 (HTX) which becomes closed at this moment upon closing of the push button 1704, and through the normally closed #6 contact 1720 of relay 1792 (1RXA). When relay 1F coil 1717 is energized the various contacts on that relay are actuated and the normally opened #1 and #2 contacts 2000 and 2001 apply power to the pull-in motor 17, which sets the lower layer of flatbeds in a forward motion. When relay coil 1716 (1FX) is energized its several contacts are actuated and the normally open #2 contacts 1721 in circuit C3 close, energizing relay coil 1727 (1FA). The 1FA normally open #1 contacts 1726 close establishing a part of the self holding circuit for the coil 1727 of relay 1FA. When coil 1717 of relay 1F is energized the normally open #3 contact 1741, circuit C4, of 1F closes, establishing a circuit for relay coil 1743 of relay VUA through the vertical up limit switches 1723 and 1730 (117 and 118 in Fig. 21) which are closed when the lifting apparatus is in the lower position. When relay VUA is energized its several contacts are actuated and a self holding circuit is established through VUA normally open #3 contact 1742. When the flatbeds have moved a sufficient distance horizontally to close the #1 forward limit switch 150, Figs. 21 and 1, the 1FT relay 1718, in circuit C2 which is a timing relay, times out and its normally closed contact opens. This contact is provided in order to allow the flatbeds to receive horizontal motion while the #1 forward limit switch 150 was opened. When the 1F relay 1717 is energized, its normally closed #6 contact 1823 in circuit C14 is opened, de-energizing the coils 1827 and 1830 of relays VT and VTX. The normally open #1 VTX contacts 1736 and the normally open #2 VUA contacts 1735 are open preventing voltage being applied to the relay coils for vertical motion, i. e.: coil 1737 of the VU relay, coil 1738 of the VUX relay and coil 1768 of the VD relay, thus acting as interlocks so that vertical motion may not be obtained while the horizontal motion is continuing. When the flatbeds have moved horizontally a distance equivalent to one parking space, the #1 forward limit switch 1703 in circuit C2 is opened by the mechanical engagement of this switch by the moved flatbed, and such opening of switch 1703 de-energizes relays 1FX, 1F and 1FT. When relay 1F is de-energized its normally open contacts #1 and #2, i. e., contacts 2000 and 2001 in circuits C16 are opened removing power from motor 17 and the flatbed stops its horizontal motion. Disconnecting of switch 1703, which corresponds to switch 150 in Fig. 21, also applied brakes 120 to motor 17 so that it stops very quickly. The latter is necessary to avoid the positioning of the flatbeds at different positions from time to time. This obviously cannot be tolerated because such indefinite positioning of the flatbeds would prevent proper functioning of the parking system. For example, flatbed D, Fig. 21, must be placed in stall D, and not half way between stall D and the elevator platform 15. The braking of the motors insures quick stopping of the motors and accurate positioning of the flatbeds and of the elevator platforms. Further, the normally open #6 1F contact, is closed energizing the VT relay coil 1827, in circuit C14. After a short time interval the normally open contact 1829 on relay VT closes energizing the VTX relay coil 1830 and the #1 VTX normally open contact 1736 in circuit C4 closes. Since the VUA relay coil 1743, circuit C4, has been previously energized, its normally open #2 contact 1735 in C4 is closed and a circuit for relay coils VU and VUX is established through the #1 VTX contact 1736, the #2 VUA contact 1735 and the #5 1F normally closed contact 1733 which has been previously returned to its closed condition, because of the de-energization of the 1F coil 1717. When the VU relay 1737 is energized, its normally opened #1 and #2 contacts 2004 and 2005, Fig. 20, are closed, applying power to motor 19 which sets the two lifting units or elevators into vertical motion in the up direction. Further, when the VU relay 1737 is energized the normally open #2 VU contact 1757 (C6) is closed which energizes the coil 1759 of relay 2FT which is not energized at this moment. Also, the normally closed #6 contact 1831 (C15) on VU relay circuit C4, is opened de-energizing the coils of relays HT and HTX, opening the normally open HTX contacts #1, #2, #3 and #4, (contacts 1713 in C2, 1754 in C6; 1819 in C13 and 1807 in C12), which prevent any horizontal motion from being established while the lifts are in vertical motion. When the lifts have both reached their maximum up positions both up limit switches 1728 and 1729, circuit C4, and switches 117 and 118 in Figs. 1 and 21 are open, deenergizing relays VU, VUX and VUA. When the VU relay 1737 is de-energized, its normally open contacts #1 and #2, which are contacts 2004 and 2005 in Fig. 20, are opened removing power from the elevator motor 19 and bringing the lifts to a stop. When the VU relay 1737 is energized, its normally closed #6 contact 1831 in circuit C15 closes and relay coil HT is energized. After a short time interval the HT normally open contact 1834 closes energizing relay HTX. The HTX contacts 1713, 1754, 1819 and 1807 are actuated and the normally open #2 HTX contact 1754 is closed. The normally open #2 contacts 1752 of the 2FA relay 1759 has been previously closed when 2FA coil was energized, and when relay VU is de-energized the #5 contact 1751, circuit C6, on VU closes. Thus, when the #2 HTX contact 1754 closes, 2F relay 1755 is energized through the above mentioned contacts 1754 and through the normally closed contact 1748 on relay 2FT. When the 2F relay 1755 is energized its #4 contact 1745 is closed energizing timing relay 2FT. Also, at this time, #1 and #2 contacts 2006 and 2007, Fig. 20, of relay 2F are closed applying power to the pull-in motor #2 1B, which provides a forward horizontal motion for the top layer of flatbeds. After the flatbeds have moved a horizontal distance sufficient to close the forward limit switch 1749 (switch 152 in Figs. 1 and 21), timing relay 2FT times out and opens its normally closed contact 1748. When relay 2F is energized its normally open #3 contact 1770, C7, is closed energizing the coil of relay VDA through the vertical down limit switches 1761 and 1762 which are closed at this time. The normally open #1 and #2 VD contacts 2008 and 2009, Fig. 20, are closed energizing the elevator motor 19, which sets the lift moving in a downward direction. Energization of the VDA relay, closes the VDA #2 contacts 1766, and since the #2 VTX contacts now are closed, relay VD becomes energized. When the VD relay 1768, C7, is energized, the #7 VD contact 1839 in C15 is opened and relays HT and HTX are de-energized, opening the normally open contact #1, #2, #3 and #4 (1713 in C2; 1754 in C6; 1819 in C13; 1807 in C12) of relay HTX to provide the horizontal-vertical interlock. When the lifts have descended to their lowest position the vertical down limit switches 1761 and 1762 are both opened, de-energizing relays VD and VDA. De-energizing of relay VD opens the normally open #1 and #2 contacts 2008 and 2009 of this relay removing power from the elevator motor 19 bringing the lifts to a stop. When the VD relay 1768 is de-energized, the VD contact in circuit C15 closes and relay coil HT is energized. After a short time the normally open HT contact 1834 closes and the HTX relay 1835 is energized, closing its normally open contacts #1, #2, #3 and #4 thus setting up the interlocking circuits for another cycle. This completes the forward cycle.

The sequence of operation for the reverse cycle is as follows:

At the beginning of the reverse cycle the flatbeds are located in the automatic parker or parking system in the manner indicated in Fig. 21 as previously described at the beginning of the forward cycle above. There is a flatbed A on the lift platform 16, flatbeds B—D on the lower floor area, and flatbeds G—I on the upper floor area. The person operating the parker presses the "Reverse" push button 1777, circuit CB, which energizes the coil 1781 of relay 1RX through the normally closed contacts 1778 of 1RXA #8, contacts 1780 of VDP #6, contacts 1782 1FA #6 and the normally open #2 contact 1775 of relay VUP which is closed at this moment. Contact 1740A in circuit C4 which is contact #2 of relay 1RX becomes closed upon energization of coil 1RX, and closing of contact 1740A energizes relay coil VUA through the normally closed #5 1F contact 1733 and the vertical up limit switches 1728 and 1729 which are closed at this moment. Since the #1 VTX contact 1736, circuit C4, has been closed during the previous operation described above, when the VDA relay 1743 is energized upon the energization of the 1RX relay 1781, the normally open #2 contacts 1735 of relay VUA close and relays VU and VUX are energized. The normally open #1 and #2 contacts 2004 and 2005, Fig. 20, of VU thereupon close applying power to the elevator motor 19 which imparts a vertical motion in the upward direction to the lifts. When the lifts have traveled upwards a short distance, the vertical down limit switches 1761 and 1762, circuit C7 become closed, energizing the coil 1774 of relay VDP. This causes the normally closed #6 contacts 1780 in circuit C8 of relay VDP to open thus de-energizing relay coil 1RX. When relay VUX in C4 is energized, its normally open #2 contact 1803 in C12 closes and such closing energizes the 2RA relay coil 1810 through the normally closed contacts 1800 of relay 2RT whose coil is in circuit C11, and relay 2RA provides a maintaining circuit through its own #3 normally open contact 1804 which closes at this time. When the lifts have reached their maximum upper position, both vertical up limit switches 1728 and 1729 are opened and relays VU, VUX and VUA are de-energized. When relay VU is de-energized its normally #1 and #2 open contacts 2004 and 2005, Fig. 20, are opened removing the power from the elevator motor 19 and bringing the lifts to a stop.

It should be noted that when relay VU is energized, in the manner described above, its normally closed #6 contacts 1831 are opened, removing power from relay coils HT and HTX thus opening the interlocking circuit C15. When relay VU is again de-energized, the #6 contacts 1831 of the VU relay close energizing relay coil HT, and, after a sufficient time interval, also energizing the normally open HT contact 1834 which closes the circuit of the relay coil HTX. This completes closing of the electrical interlock circuit C15. Further, when relay VUX is de-energized, its normally closed #6 contact 1802 in C12 closes establishing the circuit for the energizing of the 2R relay coil 1808. When relay 2R is energized its normally open #1 and #2 contacts 2010 and 2011, Fig. 20, are closed energizing the second floor pull-in motor 18 in the reverse direction, and the flatbeds on the second floor move from left to right, as viewed in Figs. 1 and 21, a distance of one parking space. Also, when relay 2R in C12 is energized its #3 contact is closed, energizing the VDA relay 1771 in C7 through the closed vertical down limit switches 1761 and 1762 and through the normally closed #5 contacts 1764 of relay 2F. The VDA relay provides its own selfholding circuit through the #3 VDA contact 1773 which now closes. When the upper flatbeds have reached the proper position, the reverse limit switch 1799 in Fig. 17, and 153 in Figs. 1 and 21, is opened, de-energizing relays 2R and 2RA and the normally open contacts #1 and #2 on relay 2R are opened, removing power from motor 18 and stopping the horizontal motion of the flatbeds. When relay 2R in C12 is energized, its normally open #4 contact 1797 in C11 is closed, energizing relay coil 2RT. The timing relay 2RT times out after the flatbeds have moved a sufficient distance to close the reverse limit switch 1799 and the normally closed 2RT contact 1800 in C12 is then opened. When relay 2R is de-energized, its normally open #4 contact 1797, C11, is opened, and relay 2RT is de-energized closing the normally closed 2RT contact 1800. Further, when relay 2R in C12 is energized, its normally closed #6 contact 1826 in C14 is opened, deenergizing the coils of relay VT and VTX, opening the electrical interlock circuit as described previously. When relay 2R is de-energized its normally closed #6 contact 1826 is closed, and the VT coil 1827 is energized. After a short interval the normally opened VT contact 1829 is closed, and relay VTX is energized, closing the normally open #1 VTX contacts 1736 in C4 and #2 VTX contacts 1767 in C7. When the #2 VTX contact 1767 is closed, a circuit is completed for the VD coil 1768 through the previously closed #2 contact 1766 of relay VDA and #5 contact of relay 2R. When relay VD is energized, it closes its #1 and #2 contacts 2008 and 2009, Fig. 20, and applies power to the elevator motor 19 in such a direction as to move the lifts down. Also, when relay VD in C7 is energized, the normally open #3 VD contact 1815 in C13 is closed, energizing relay coil 1RA through the normally closed contact 1812 of relay 1RT, and relay 1RA provides its own maintaining circuit through a normally opened #3 1RA contact 1816. When the flatbeds have reached their maximum down position the vertical down limit switches 1761 and 1762 in C7 are opened and relays VD and VDA are de-energized. When relay VD is de-energized, the normally open #1 and #2 contacts 2008 and 2009, Fig. 20, on that relay are opened and power is removed from the elevator motor 19. The #7 VD contact 1839, which has been opened previously when relay VD was energized, is now closed, and relay coil HT in C15 is energized. After a short interval the normally open HT contact is closed and relay HTX is energized closing the electrical interlock circuit C15 as described previously. When relay HTX is energized, its normally open #3 contact 1819 in C13 closes; this completes the circuit through the previously closed #2 1RA contact 1817, the #5 VD contacts 1814 and through the normally closed 1RT contact 1812. When relay 1R in C13 is energized, its normally open #1 and #2 contacts 2002 and 2003 apply power to the ground level pull-in motor 17 so as to provide a reverse motion for the lower layer of flatbeds. Further, at this time the #6 1R contact 1825 in C14, is opened, which de-energizes relays VT and VTX; de-energization of these relays opens the electrical interlock circuit. When relay 1R in C13 is energized, the #4 1R contact 1793 in C10 closes energizing relay coil 1RT. After the flatbeds have moved a sufficient horizontal distance to close the reverse limit switch 1811 in C13, the 1RT timing relay 1794 in C10 times out and opens its normally closed 1RT contact 1812 in C13. When the flatbed is moved a horizontal distance corresponding to one parking space, the #1 reverse limit switch 1811 in C13 is again opened de-energizing relays 1R and 1RA. When relay 1R is de-energized, power is removed from the ground floor pull-in motor 17 due to the opening of #1 and #2 contacts 2002 and 2003 of relay 1R. Contact #6 on relay 1R, which is contact 1825 in C14, closes and timing relay coil VT is energized. After a short interval the normally open VT contact 1829, also in C14, is closed and relay VTX is energized establishing the electrical interlock circuit. This completes the reverse cycle.

It should be noted that there are four protective relays provided in this relay control system in addition to the timing electrical interlock circuits provided by relays VT and VTX in circuit C14 and HT and HTX in circuit C15. The protective relays are 1FA in circuit C3, VUP in C4, VDP in C7 and 1RXA in C9.

Relay 1FA is energized by #2 normally opened contact 1721 on relay 1FX in circuit C2 and remains energized through the successive closing of the #1 contacts on relays VUA, VDA and 2FA, which are contacts 1722, 1723 and 1724, respectively. As long as relay 1FA is energized, it prevents a reverse cycle operation being initiated inasmuch as it opens the coil circuits to those relays in circuits C10 through C13 which establish the reverse direction of motion for the flatbeds and the lifts. This is accomplished by the opening the #7 1FA contacts 1796 which are normally closed. These normally closed contacts 1796 connect bus 1795 to the main bus 1701. However, when the 1FA relay 1727 is energized, the #7 1FA contacts become opened and remain open so long as relay 1FA coil is energized, which is the case as long as the forward cycle is in operation.

The protective relay 1RXA, or relay 1792 in series with the circuit C9, which is energized by a #3 1RX normally open contact 1784 on the 1RX relay 1781 in C8, and maintained by the #4 contacts of the following relays: VUA, 2RA, VDA and 1RA; relay 1RXA serves the same purpose as relay for the reverse cycle.

Relay VUP in C4 remains energized at any time the lifts, or the elevators 15 and 16, are not in the maximum up position. This is accomplished by means of the normally closed contacts #5 VUP, or 1753, in circuit C6, and the normally closed contacts 1806 in circuit C12. This protects the equipment against any horizontal motion being established on the upper level, or the second floor, while the lifts are in an improper location for such horizontal motion.

The VDP relay in C7 is energized at any time the flatbeds are not at their maximum down position and serves the same purpose as VUP. Accordingly, its normally closed contacts #7 VDP, or 1712, are in series with the forward limit switch circuit C2, which energizes the ground level pull-in motor 17 through contacts 2000 and 2001; the second set of contacts #5 VDP, or 1818, is in series with the reverse limit switch 1811 in C13 and also in series with relay 1R, or 1820; it should be remembered that the 1R contacts 2002 and 2003 are also in series with motor 17.

A phase failure and phase reversal relay RPR is provided as indicated on the simplified diagram. Its contact 1837, which is normally closed when the relay is energized, is in one leg of the control bus so that if the relay should fail to operate or should be de-energized for any reason the control circuit will not be able to receive power and thus cannot operate. This relay is provided to protect equipment against the loss of one phase and/or a phase reversal which latter would cause all of the motors to run in the wrong directions. It should be noted that overload relays are provided with the heaters connected in the control circuit bus. In case of an overload on any one or all of the motors the corresponding overload relays would be tripped and would remove power from the control circuits and thus from the motors. A stop switch 1702 is provided in the push button station in case trouble should develop during operation and it would be desirable to stop the operation immediately. Opening of the stop switch removes power from the control circuit and all equipment will be de-energized.

It should be noted that although the control described above is arranged for a two layer parker this should not be construed to mean that only a two layer parker can be provided. On the contrary, with the proper arrangement of selecting circuits any number of layers could be provided and the operation would be essentially as described above.

The inventors claim:

1. An automatic automobile parking system comprising a first elevator having a first platform and movable alternately upwardly and downwardly, a second elevator having a second platform and movable alternately upwardly and downwardly, a first plurality of stalls between said first and second elevators, said first plurality of stalls being located at the same level as the lower-most positions of said first and second platforms on said elevators when said elevators are in the lower-most position, a second plurality of stalls in vertically spaced relationship with respect to said first plurality of stalls, the respective second stalls being vertically and horizontally aligned with the respective first stalls, a plurality of carriages for receiving automobiles, said carriages being adapted for simultaneous disposition in all of said stalls, an additional carriage adapted to be disposed on one of said platforms, first track means for lateral shifting of said carriages from one elevator to the other elevator and through the first set of stalls, a second track means for lateral shifting of said carriages from any one of said elevator platforms to the other elevator platform through said second set of stalls, means for pulling said carriages to and from said elevator platforms, and an automatic relay system including two pull motors and a common elevator motor for shifting said elevators simultaneously in an up direction and simultaneously in a down direction and for shifting said carriages from said first platform to said first set of stalls and from said first set of stalls to said second platform or from said first platform to the second set of stalls and from said second set of stalls to said second platform, and means for energizing one of said pull motors in response to alignment of said platforms with one of said track means.

2. An automatic automobile parking system comprising a first elevator having a first platform and movable alternately upwardly and downwardly, a second elevator having a second platform and movable alternately upwardly and downwardly, a first plurality of stalls between said first and second elevators, said first plurality of stalls being located at the same level as the lowermost positions of said first and second platforms on said elevators when said elevators are in the lowermost position, a second plurality of stalls in vertically spaced relationship with respect to said first plurality of stalls, the respective second stalls being vertically and horizontally aligned with the respective first stalls, a plurality of carriages for receiving automobiles, said carriages being adapted for simultaneous disposition in all of said stalls, a carriage adapted to be disposed on one of said platforms, first track means for lateral shifting of said carriages from one elevator to the other elevator and through the first set of stalls, a second track means for lateral shifting of said carriages from any one of said elevator platforms to the other elevator platorm through said second set of stalls, an automatic relay system including two pull motors and a common elevator motor for shifting said elevators in an up direction and in a down direction and for shifting said carriages from said first platform to said first set of stalls and from said first set of stalls to said second platform or from said first platform to the second set of stalls and from said second set of stalls to said second platform, said relay system including first relay means for connecting said pull motors to a source of power for causing said motors to rotate in one direction, second means for connecting said pull motors to a source of power for causing said motors to rotate in the opposite direction, said first means including first lock-out means for locking out said second means when said first means is in operation, and said second means having second lock-out means for locking out said first means when said second means is in operation.

3. An automatic automobile parking system comprising a first elevator means movable alternately upwardly and downwardly, a second elevator means movable alternately upwardly and downwardly, a first plurality of automobile stalls between said elevators located on the level corresponding to the low level position of said elevators, a second plurality of automobile stalls in vertically spaced relationship with respect to the first set of stalls, a common elevator motor and a relay system for simultaneously raising and then simultaneously lowering said elevators from said low level to said upper level and vice versa, whereby said elevators can be located simultaneously at said low level or at said upper level, a first pull-in motor located at the level of said first plurality of automobile stalls and a second pull-in motor located at the level of the second plurality of the automobile stalls, first relay means for causing said first pull-in motor to rotate in a clockwise direction, a second relay means for effecting rotation of said first pull-in motor in a counter-clockwise direction, a third relay means for effecting rotation of said second pull-in motor in a clockwise direction and a fourth relay means for effecting rotation of said second pull-in motor in a counter-clockwise direction.

4. An automatic automobile parking system as defined in claim 1, in which said first and second track means each includes a two rail track extending from end-to-end of each series of stalls for lateral shifting of said carriages, and a two rail track on said first platform and a two rail track on said second platform for lateral shifting of said carriages off said platforms and onto the tracks of said stalls.

5. An automatic automobile parking system comprising a first plurality of flatbeds, a first series of stalls for storing said flatbeds, said flatbeds having a length L, and a width W, said stalls also having a length L and width W, said flatbeds being positioned in said stalls sideways, a second plurality of flatbeds and a second series of stalls identical to the first series, means for supporting said second series of stalls directly above and in a vertically spaced relationship with respect to the first set of stalls, a first elevator at one end of said stalls, said first elevator having a first platform for receiving a flatbed, a second elevator at the other end of said stalls, said second elevator having a platform for receiving a flatbed, relay controlled motors for rotating said flatbeds in a clockwise or a counter-clockwise direction around the closed travel loop formed by said two elevators and two series of stalls, a two-rail track extending from end to end of each series of stalls for lateral shifting of said flatbeds, a two-rail track on said first platorm and a two-rail track on said second platform for lateral shifting of said flatbeds off said platforms and onto the tracks of said stalls, first and second pull-in motors for said first and second series of stalls, respectively, first and second transverse shafts each having first and second sprocket wheels mounted at the respective ends of the respective shafts, first and second endless sprocket chains interconnecting the first sprocket wheel of the first shaft with the first sprocket wheel on the second shaft, and the second sprocket wheels of the first and second shafts, respectively, a sprocket-and-chain connection between the respective motors and the respective first shafts, said endless chains including chain links, chain link pins joining said links, said links revolving around said pins, each pin having a pin extension extending on one side beyond the links joined by said pin, and two plate teeth at each corner of the flatbed for engaging said pin extensions, said plate teeth being spaced apart a distance equal to the distance between the centers of two adjacent pin extensions plus the diameter of said pin extension, whereby any two adjacent pin extensions form a sliding fit with two opposed surfaces of said plate teeth for lateral shifting of said flatbeds in a forward or reverse direction along said tracks.

6. An automatic automobile parking system as defined in claim 5 which also includes a relay system, a first pull-in motor for laterally shifting said flatbeds from end-to-end of said first series of stalls, said relay system including a first relay channel for connecting said first pull-in motor to a source of power in such manner as to advance said flatbeds in the forward direction, which is the direction from the first elevator platform toward and through said first series of stalls, and a second relay channel for reversing the connections of said first pull-in motor for advancing said flatbeds in the reverse direction, opposite to the first direction.

7. An automatic automobile parking system as defined in claim 6 in which said first relay channel includes means for connecting said first pull-in motor to said source of electric power for the clockwise rotation of said first pull-in motor, and said second relay channel includes means for connecting said first pull-in motor to said source for obtaining the counter-clockwise rotation of said first pull-in motor.

8. An automatic automobile parking system as defined in claim 7 in which said relay system includes a plurality of additional relay channels, said first relay channel and said additional channels having means for locking out said additional channels and said second relay channel when said first channel is in operation.

9. An automatic automobile parking system as defined in claim 8 in which said second relay channel and said additional channels have means for locking out said additional channels and said first relay channel when said second channel is in operation.

10. An automatic automobile parking system as defined in claim 9 in which said relay system includes automatic means for instantaneously deactivating all channels because of loss of phase, reversal of phase and overload conditions, and manually operated push button means for instantaneously deactivating all of said channels.

11. An automatic automobile parking system as defined in claim 5 which also includes a relay system, a second pull-in motor for laterally shifting said flatbeds from end-to-end of said second series of stalls, said relay system including first and second relay channels and a source of power, said first relay channel connecting said motor to said source for a clockwise rotation of said motor, and said second relay channel connecting said second motor to said source for a counter-clockwise rotation of said motor, whereby said motor is capable of shifting said flatbeds in two opposite lateral directions.

12. An automatic automobile parking system comprising a first plurality of flatbeds, a first series of stalls for storing said flatbeds, said flatbeds having a length L, and a width W, said stalls also having a length L and width W, said flatbeds being adapted to be positioned simultaneously in all of said stalls sideways, a second plurality of flatbeds and a second series of stalls identical to the first series, said second plurality of flatbeds being adapted to being positioned simultaneously in all of said second series of stalls, means for supporting said second series of stalls directly above and in a vertically spaced relationship with respect to the first set of stalls, a first elevator at one end of said stalls and movable alternately upwardly and downwardly, said first elevator having a first platform for receiving a flatbed, a second elevator at the other end of said stalls and movable alternately upwardly and downwardly, said second elevator having a platform for receiving a flatbed, a flatbed on one of said platforms while all stalls of said first and second series are occupied simultaneously by flatbeds, with said other platform devoid of a flatbed, relay controlled motors for simultaneously raising or lowering said elevators and for rotating said flatbeds in a clockwise or a counter-clockwise direction around the closed travel loop formed by said two elevators and two series of stalls, said relay controlled motors including a first pull-in motor, a first relay channel connecting said first motor to a source of power for a clockwise rotation of said first motor and for a lateral shifting of said flatbeds from the first platform through said first series of stalls and to said second platform, a second relay channel connecting said first motor to said source of power for a counter-clockwise rotation of said first motor and for a lateral shifting of said flatbeds rom the second platform through said first series of stalls and to said first platform, a second pull-in motor and third and fourth relay channels for connecting and reversing the connections of said second motor to said source, respectively, whereby said second motor is capable of shifting said flatbeds first in one direction and then in the opposite direction along said second series of stalls.

13. An automatic parking system as defined in claim 12 which also includes a single elevator motor, mechanical means connecting said elevator motor to said first and second elevators, and fifth and sixth relay channels for connecting said motor to said source first for automatically and simultaneously lifting said elevators and then automatically and simultaneously lowering said elevators.

References Cited in the file of this patent

UNITED STATES PATENTS

| 1,458,881 | Gromer | June 12, 1923 |
| 1,905,229 | James et al. | Apr. 25, 1933 |
| 2,186,854 | Auger et al. | Jan. 9, 1940 |
| 2,569,393 | Walker | Sept. 25, 1951 |
| 2,679,323 | Patterson | May 25, 1954 |

FOREIGN PATENTS

| 576,381 | Great Britain | Apr. 1, 1946 |